US012484993B2

(12) United States Patent
Watson

(10) Patent No.: US 12,484,993 B2
(45) Date of Patent: *Dec. 2, 2025

(54) FIXATION BASE AND GUIDES FOR DENTAL PROSTHESIS INSTALLATION

(71) Applicant: Jason Watson, Pasadena, CA (US)

(72) Inventor: Jason Watson, Pasadena, CA (US)

(73) Assignee: Watson Guide IP LLC, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,029

(22) Filed: Oct. 13, 2023

(65) Prior Publication Data

US 2024/0033050 A1 Feb. 1, 2024

Related U.S. Application Data

(63) Continuation of application No. 17/503,359, filed on Oct. 18, 2021, now Pat. No. 11,806,209, which is a
(Continued)

(51) Int. Cl.
*A61C 8/00* (2006.01)
*A61C 1/08* (2006.01)
(Continued)

(52) U.S. Cl.
CPC ............ *A61C 8/0053* (2013.01); *A61C 1/084* (2013.01); *A61C 8/0048* (2013.01);
(Continued)

(58) Field of Classification Search
CPC ... A61C 8/0053; A61C 8/0048; A61C 8/0068; A61C 8/0087; A61C 8/0095;
(Continued)

(56) References Cited

U.S. PATENT DOCUMENTS 6,672,870 B2 1/2004 Knapp
9,381,072 B2 7/2016 Furrer
(Continued)

FOREIGN PATENT DOCUMENTS

CN 105686886 A 6/2016
WO WO 2009115283 A1 9/2009
WO WO 2017069797 A1 4/2017

OTHER PUBLICATIONS

Pikos, Full Arch Guided Implant Surgery—Same Day Teeth Surgical Instruction Course All on 4, https://www.youtube.com/watch?v=e-MD8Q8uJkc, Pikos Institute, Mar. 2014.
(Continued)

*Primary Examiner* — Eric J Rosen
*Assistant Examiner* — Mirayda A Aponte
(74) *Attorney, Agent, or Firm* — James A. Italia; Italia IP

(57) ABSTRACT

Apparatus and method for installing a multi-tooth dental prosthesis in one session are shown and described. A first tool attaches to the jawbone, and serves as a foundation for subsequently used guides. Existing teeth and dental fixtures are removed, and the bone tissue is removed to accommodate the prosthesis. Subsequently, a drill guide is used to drill implant holes. An abutment guide is then used to place abutments. Copings are then installed. Next, the prosthesis may be installed and cemented to the copings. A resinous filler material may be applied to fill gaps and holes in and between the copings and the prosthesis, and is sanded smooth.

11 Claims, 19 Drawing Sheets

Related U.S. Application Data continuation of application No. 15/984,309, filed on May 18, 2018, now Pat. No. 11,173,016.

(60) Provisional application No. 62/508,377, filed on May 18, 2017.

(51) Int. Cl.
  *A61C 3/02* (2006.01)
  *A61C 13/225* (2006.01)
  *A61C 13/00* (2006.01)
  *A61C 13/07* (2006.01)

(52) U.S. Cl.
  CPC .......... *A61C 8/0068* (2013.01); *A61C 8/0087* (2013.01); *A61C 8/0095* (2013.01); *A61C 13/225* (2013.01); *A61C 3/02* (2013.01); *A61C 8/0051* (2013.01); *A61C 8/0074* (2013.01); *A61C 8/0089* (2013.01); *A61C 13/0004* (2013.01); *A61C 13/0006* (2013.01); *A61C 13/0025* (2013.01)

(58) Field of Classification Search
  CPC ... A61C 8/0051; A61C 8/0074; A61C 8/0089; A61C 8/005; A61C 8/00; A61C 8/0093; A61C 1/082; A61C 1/084; A61C 8/0028; A61B 17/176; A61B 2034/102; A61B 2034/108
  USPC ...................................... 433/173–176, 201.1
  See application file for complete search history.

(56) References Cited

U.S. PATENT DOCUMENTS

| | | | | |
|---|---|---|---|---|
| 11,173,016 B2* | 11/2021 | Watson | ................ | A61C 8/0095 |
| 2013/0071811 A1 | 3/2013 | Groscurth et al. | | |
| 2014/0272778 A1 | 9/2014 | Llop | | |
| 2015/0010881 A1* | 1/2015 | Llop | ................... | A61C 8/0089 |
| | | | | 433/215 |
| 2016/0038255 A1 | 2/2016 | Llop | | |
| 2017/0112592 A1 | 4/2017 | Groscurth | | |
| 2017/0252126 A1* | 9/2017 | Llop | ................... | A61C 8/0092 |
| 2020/0015934 A1* | 1/2020 | Llop | ................... | A61B 17/176 |

OTHER PUBLICATIONS

Harris et al., Creation of a 3-Dimensional Virtual Dental Patient for Computer-Guided Surgery and CAD-CAM Interim Complete Removable and Fixed Dental Prosthesis: A Clinical Re.

Ibur Biosystems, Surgical Guide Options, http://www.iburbiosystems.com/wp-content/uploads/2014/12/Surgical-Guide-Options.pdf, Mar. 2016.

Scherer et al., All-on-4® nSequence® Implant Surgical Technique Using Zest Chairside® Attachment Processing Material, nSequence, https://www.youtube.com/watch?v=VOWRdFpfnGI, O.

Alzoubi et al., Bone Reduction to Facilitate Im mediated Implant Placement and Loading Using CAD/CAM Surgical Guides for Patients with Terminal Dentition, Journal of Oral Impl.

Office Action, U.S. Appl. No. 15/984,309, Mar. 19, 2020.

Charette et al., Cone Beam Computad Tomography Imaging as a Primary Diagnostic Tool for Computer-Guided Surgery and CAD-CAM Interim Removable and Fixed Dental Prostheses, The.

Natallie Y. Wong, "Predictable Immediate Implant Prosthetics using Guided Surgery and Guided Prosthetics: A Case Report," Oral Health Group, Jan. 2016.

Pikos et al., "Guided Full-Arch Immediate-Function Treatment Modality for the Edentulous and Terminal Dentition Patient," Copendium, Feb. 2015, vol. 36, Issue 2.

Zhang et al., Accuracy of virtual surgical planning in two-jaw orthognathic surgery: comparison of planned and actual results, Oral and Maxillofacial Surgery, Aug. 2016, vol.

\* cited by examiner

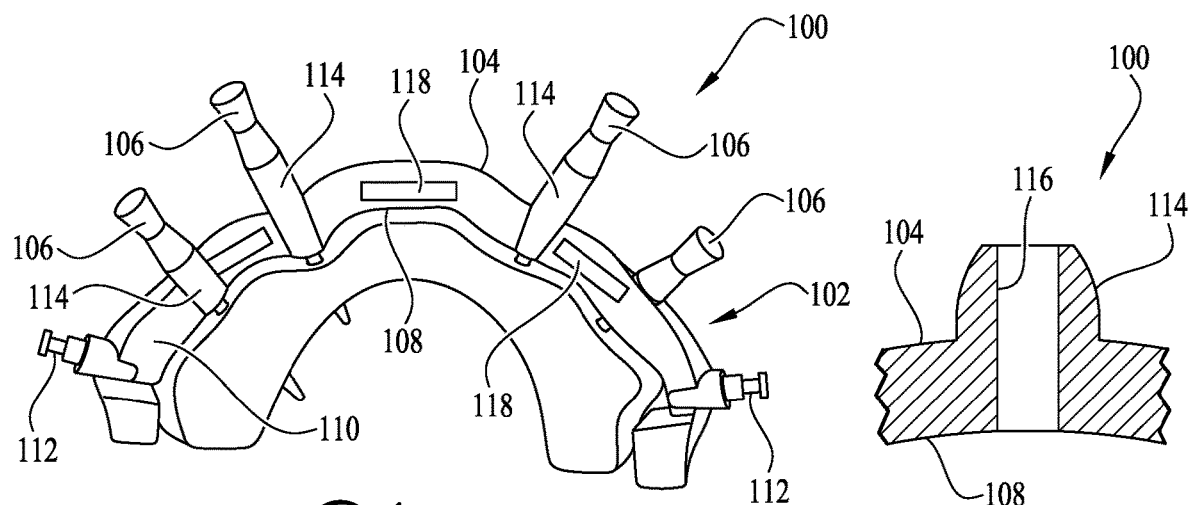
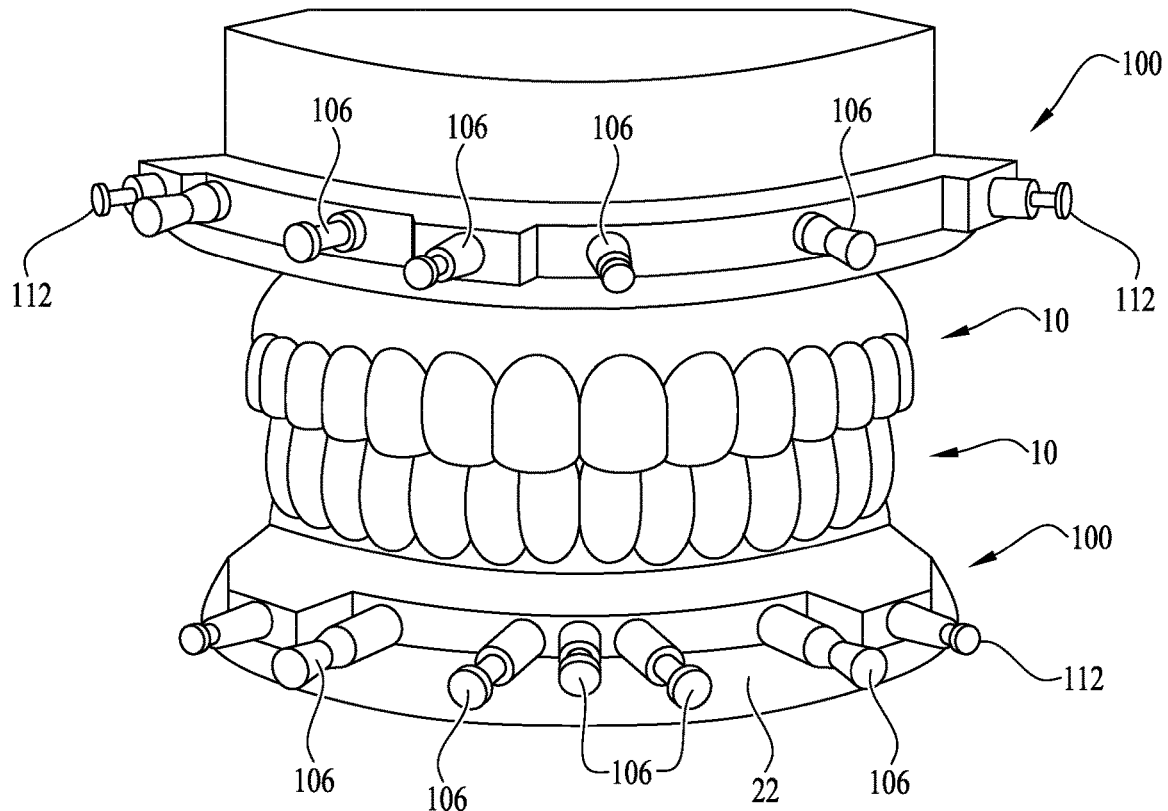

FIXATION BASE AND GUIDES FOR DENTAL PROSTHESIS INSTALLATION

CROSS-REFERENCE TO RELATED APPLICATIONS

This is a continuation application of application Ser. No. 17/503,359 which has a filing date of Oct. 18, 2021, which is a continuation application of application Ser. No. 15/984,309, which has a filing date of May 18, 2018 and claims priority to Application Ser. No. 62/508,377, filed May 18, 2017, the contents of each application is incorporated herein by this reference.

FIELD OF THE INVENTION

The present invention relates to method and apparatus for installing a prefabricated dental prosthesis in the mouth of a patient.

BACKGROUND OF THE INVENTION

For some dental patients, a multi-tooth prosthesis must be installed in a jaw. While multi-tooth prostheses have been developed for anchorage via implants, existing methods and apparatuses for accomplishing such installations are complex, and require considerable time for completion.

SUMMARY OF THE INVENTION

The present invention improves on prior art prosthesis installations by providing a method enabling installation of a multi-tooth prosthesis anchored in implants. The entire procedure can be completed in one session at a dental practitioner. The resulting installation is usable shortly after the procedure has been completed.

The procedure is based on geometric dental guides and a prosthesis all of which are designed around images taken of the patient anatomy. A first tool is attachable to the jawbone, and provides geometrically correct reference points for subsequent operations. The first tool, called a fixation base hereinafter, locates other important geometric dental guides, and remains in place on the dental anatomy for most of the procedure. Installation of the fixation base may be accomplished in conjunction with a second tool, called a mouthpiece hereinafter. The mouthpiece is formed to more of the maxillary or mandibular structure than that contacted by the fixation base from the images, and assists in appropriately setting the fixation base in appropriate location. The mouthpiece may be removed after installation of the fixation base.

With only the fixation base installed, undesired teeth, previously installed dental fixtures, and obstructive body tissues are removed from the work site. Exposed maxillary or mandibular bone is then recontoured by abrasive removal of tissue. The fixation base may be formed with a guide surface to guide a powered reciprocating abrading tool. Alternatively, a separate guide may be provided.

A third dental guide, hereinafter called an abutment guide base, may then be installed to the fixation base. The abutment guide base has holes in abutment sites, and is used to confirm appropriate preparation of the maxillary or mandibular bone tissue. The abutment guide base may then be removed.

Using a fourth tool, a drill guide installed to the fixation base, holes for implants are drilled into the exposed and recontoured bone. Implants are installed in the drilled holes. The drill guide may then be removed, leaving the fixation base in place.

The abutment guide base is installed to the fixation base, and abutments are installed. The abutment guide base has notches appropriately located to index each abutment for appropriate angular orientation on its associated implant.

Copings are then installed using the abutments. The prefabricated prosthesis is then installed over the copings. A settable resin is then applied to bond the copings to the prosthesis. The prosthesis, now integrated with the copings, is removed so that the abutment guide base and fixation base may be removed.

Appropriate restorative steps for the patient's anatomy are then performed, such as suturing the gums.

The prosthesis is then installed for use. A resinous filler material is applied to fill recesses, e.g., gaps between the prosthesis and copings exposed on rearwardly facing surfaces of the prosthesis. The filler is cured and appropriately sanded smooth.

The above steps are summarized, and do not include minor conventional steps such as irrigation. Once the steps are completed, the installation is complete, and may be used by the patient.

The present invention provides improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is an environmental plan view of a fixation base used to install a dental prosthesis, according to at least one aspect of the invention;

FIG. 2 is a front view of maxillary and mandibular prostheses, shown with apparatus of the invention attached thereto, and fixed to models of maxillary and mandibular jawbones;

FIG. 3 is an enlarged detail view of a portion of the fixation base of FIG. 1;

DETAILED DESCRIPTION

Figure 4:
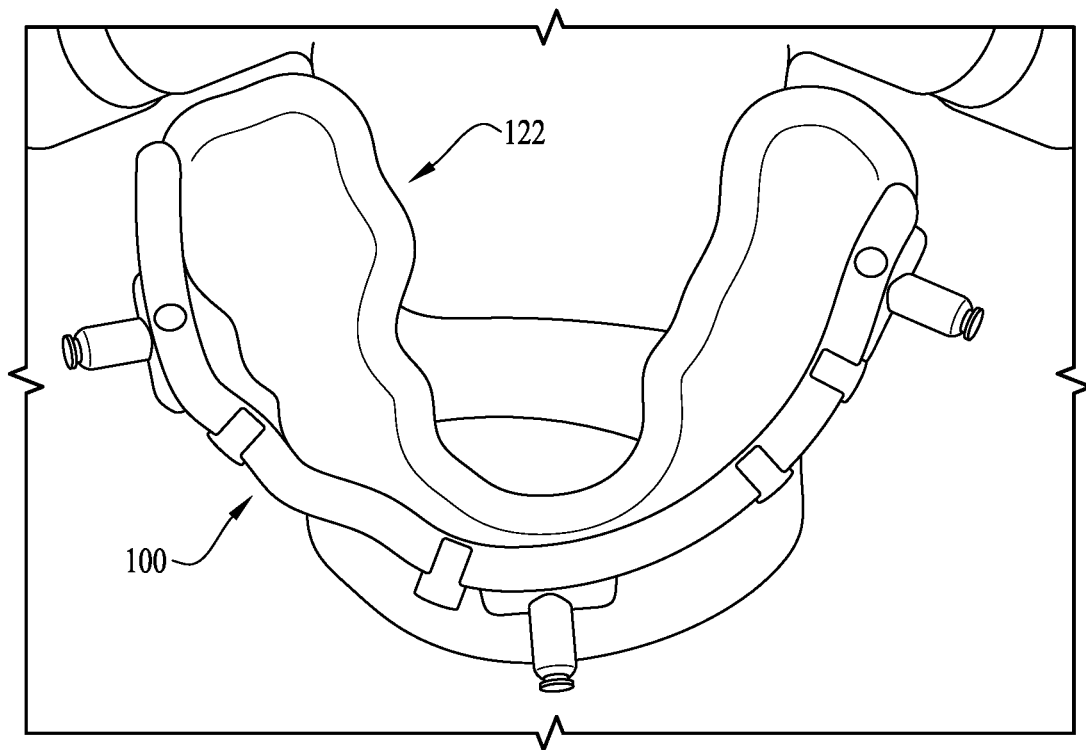
FIG. 4 is a plan view of the fixation base of FIG. 1, shown attached to a mouthpiece.
Figure 10:
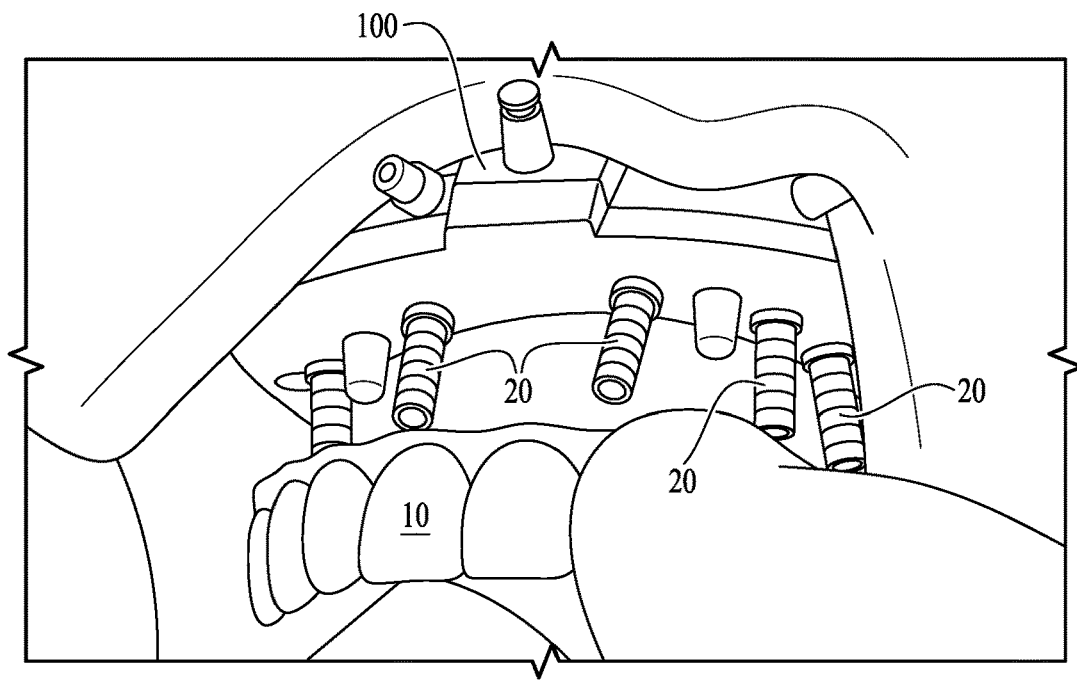
FIG. 10 is an environmental front view of the fixation base of FIG. 1, installed on a patient during fitting of a prosthesis over installed copings.
Figure 11:
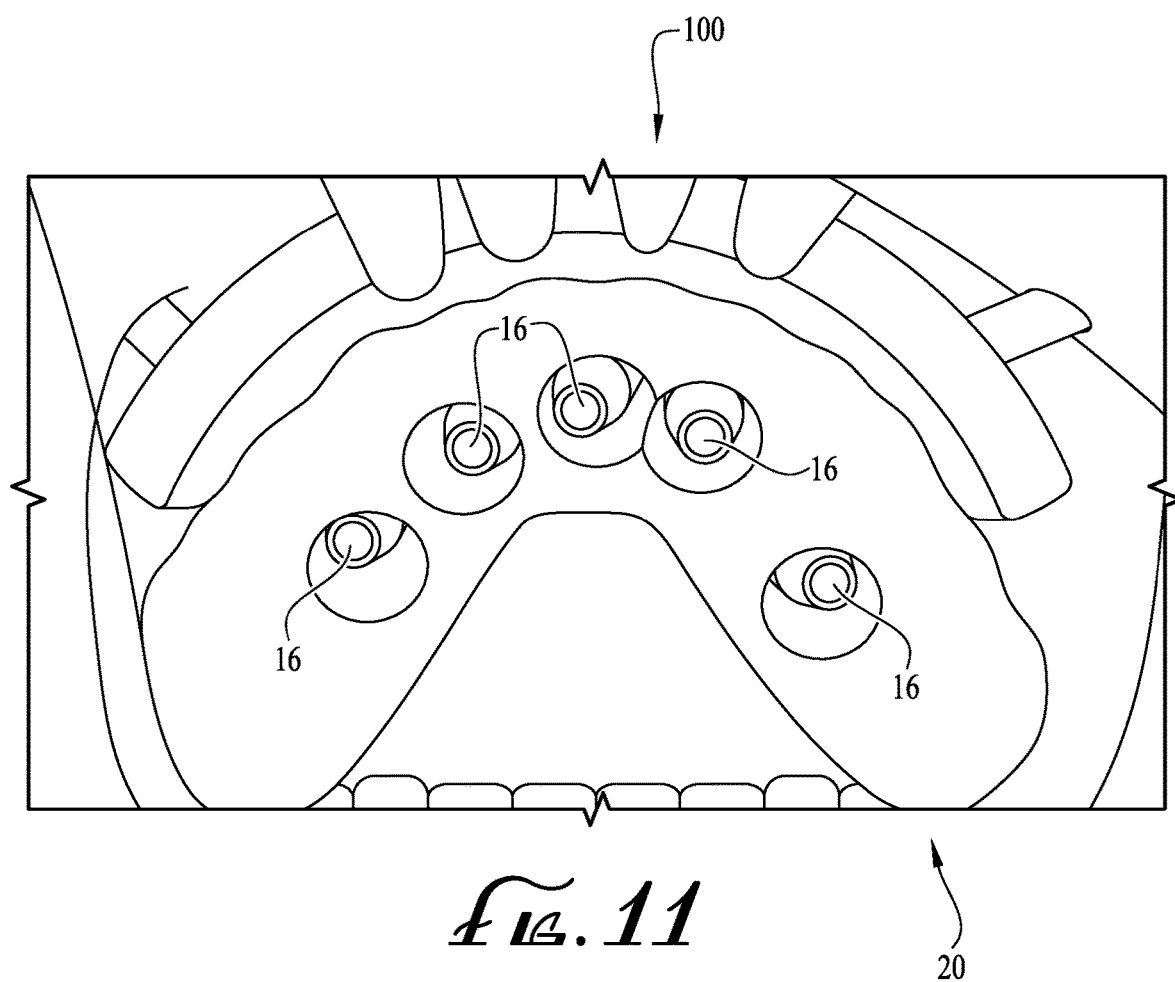
FIG. 11 is an environmental plan view of a prosthesis and implants against a patient, with the fixation base of FIG. 1 installed.

Referring first to FIG. 1, according to at least one aspect of the invention, there is shown apparatus for installing a dental prosthesis 10 (see FIG. 2) to a maxillary or mandibular jaw bone (see FIGS. 10 and 11) of a patient 14 (FIG. 5B) in a single session, using implants 16 (see FIG. 11). The apparatus may comprise a fixation base 100 for providing an attachment surface for other apparatus used to orient implants 16, abutments 18 (FIG. 9), copings 20, and dental prosthesis 10 during an installation procedure. Fixation base 100 may further comprise a generally arcuate base member 102 having a front surface 104 bearing a plurality of fasteners 112, a rear surface 108 configured and dimensioned to fit flushly against a maxillary or mandibular bone structure of the patient, and a horizontal surface 110 bearing first attachment elements 106 for engagement of a first dental guide 122 (see FIG. 4) usable with fixation base 100, and wherein fixation base 100 is non-anatomical.

Fixation base 100 is usable with either the mandibular or maxillary jaw bone, as seen in FIG. 2, which uses artificial models 22 of jawbones. Hence, orientation of fixation base 100 changes with use. Description herein will focus on maxillary use, it being understood that the same principles apply for mandibular use. With discussion directed to maxillary use, orientational terms will assume that the head of the patient is facing forwardly in a normal position that would occur with the patient standing straight on his or her legs. Alternatively stated, it is assumed for purposes of discussion that the maxillary jawbone is above the novel apparatus. Therefore, orientational terms such as vertical, horizontal, forwardly, and rearwardly must be understood to provide semantic basis for purposes of description, and do not limit the invention or its component parts in any particular way.

Fixation base 100 provides not only an attachment surface for other apparatus, but also locates the other apparatus precisely for the dental procedure. Fasteners 112 may be nails, for example. Close fitting holes are drilled into the maxillary jawbone to receive fasteners 112. First attachment elements 106 may comprise pins, threaded bolts, or other manually removable fasteners, and are made to cooperate with corresponding openings in the other apparatus to be mounted on fixation base 100. Fixation base 100 is non-anatomical, being fabricated from a metal, metal alloy, or other strong material. Fixation base 100 may be fabricated for example by three dimensionally printing using a chromium cobalt alloy.

Unless otherwise indicated, the terms "first", "second", etc., are used herein merely as labels, and are not intended to impose ordinal, positional, or hierarchical requirements on the items to which these terms refer. Moreover, reference to, e.g., a "second" item does not either require or preclude the existence of, e.g., a "first" or lower-numbered item, and/or, e.g., a "third" or higher-numbered item.

In one example of the invention, fixation base 100 comprises a plurality of bosses 114 (see FIG. 1) extending radially from the front surface, including bores 116 (see FIG. 3) for receiving and aligning first attachment elements 106. Fixation base 100 may also comprise a plurality of slots 118 for accepting tabs (not shown) of the first dental guide 122. Bosses 114 provide effective guidance surface for attachment elements 106, while minimizing mass of fixation base 100. This characteristic enables the dental practitioner to view the work site more effectively than would be the case if fixation base 100 were larger, thereby obscuring the work site.

Although fixation base 100 is utilized by itself, properly locating fixation base 100 will likely require an additional guide component. To this end, and referring especially to FIG. 4, the apparatus may further comprise first dental guide 122, wherein first dental guide 122 is a mouthpiece configured and dimensioned to surround teeth (not shown) of the patient, and to releasably attach to fixation base 100. First dental guide 122 may comprise a plurality of tabs (not shown, but similar to tabs 140, FIG. 6) corresponding in configuration to slots 118 (FIG. 1) extending toward and fitting closely with slots 118 of fixation base 100. First dental guide 122 engages fixation base 100 by interfit between slots 118 of fixation base 100 and the tabs of first dental guide 122. The purpose of first dental guide 122 is to assist in locating fixation base 100 with sufficient precision to assure successful installation of dental prosthesis 10. Therefore, first dental guide 122 is used when installing fixation base 100 in the mouth, but is removed thereafter and plays no further role. Subsequently used dental guides use tabs corresponding to those of first dental guide 122, in the same way, and to the same end, that of precisely locating the subsequently used dental guides prior to fixing the latter using attachment elements 106.

The apparatus may further comprise a second dental guide 124, wherein second dental guide 124 is a drill guide for guiding drilling of holes for implants 16. The drill guide is attachable to fixation base 100 in a position wherein the drill guide is in vertical registry with the maxillary or mandibular jaw bone. The drill guide may include a seating feature cooperating with attachment elements 106 of fixation base 100, and a plurality of generally vertical bores 126 corresponding in location to and in axial registry with intended implant sites. The recited structure both pins second dental guide 124 securely to fixation base 100, and also properly orients vertical bores 126 relative to bone tissue, to assure appropriate orientation of implant holes drilled into the jaw. Second dental guide 124 may include stops (not separately shown) within bores 126, to prevent excessive penetration of drills into bone tissue. These stops may comprise e.g. shoulders interfering with the drill.

Figure 5A:
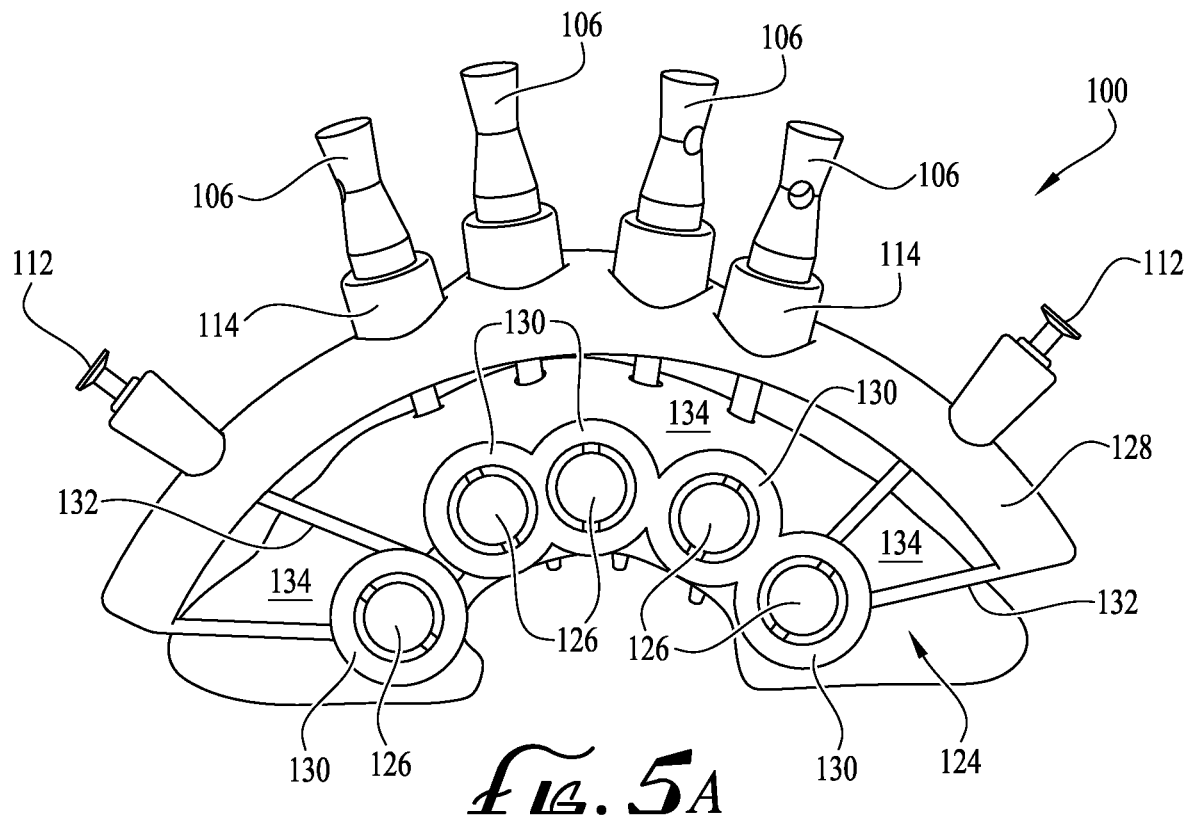
FIG. 5A is a plan view of a drill guide attached to the fixation base (the latter first shown in FIG. 1)
Figure 5B:
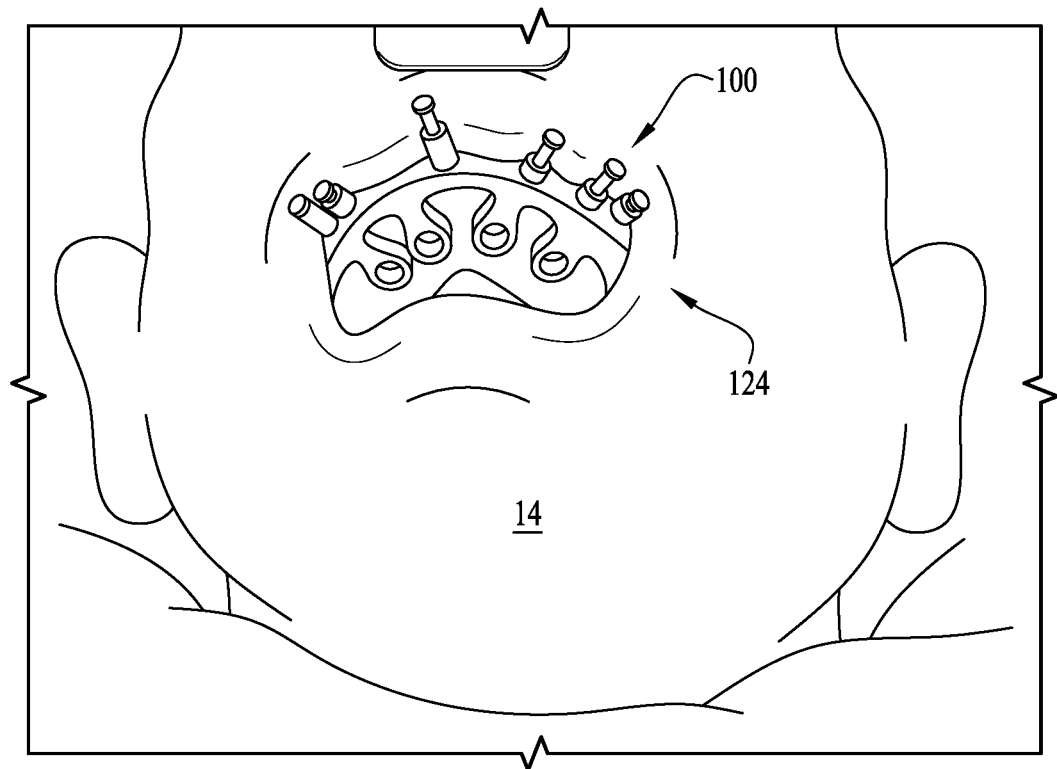
FIG. 5B corresponds to FIG. 5A, but shows the drill guide and fixation base as installed in an actual patient.

Referring particularly to FIG. 5A, the drill guide may be made from a metal or metallic alloy, and comprises a support bar 128 attachable to fixation base 100 (via attachment elements 106), one boss 130 for each one of vertical bores 126, bosses 130 attached to support bar 128 by arms 132 such that voids 134 exist between bosses 130 and support bar 128. Voids 134 enable direct observation of patient anatomy and insertion of irrigation and evacuation apparatus.

Figure 6:
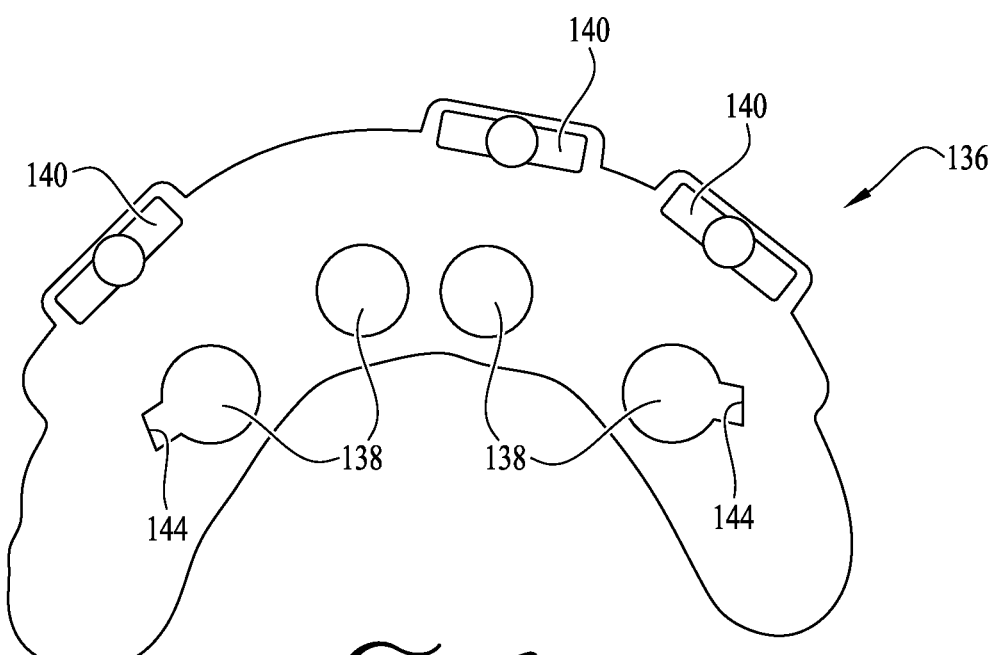
FIG. 6 is a plan view of an abutment guide, to be attached to the fixation base of FIG. 1.

With reference to FIG. 6, the apparatus may further comprise a third dental guide 136. Third dental guide 136 is an abutment guide base including bores 138 sized and oriented to receive abutments 18 and guide abutments 18 for placement against implants 16. The abutment guide base is attachable to fixation base 100 in a position wherein bores are in vertical registry with the maxillary or mandibular jaw bone and implants 16 after installation of the latter.

Figure 7:
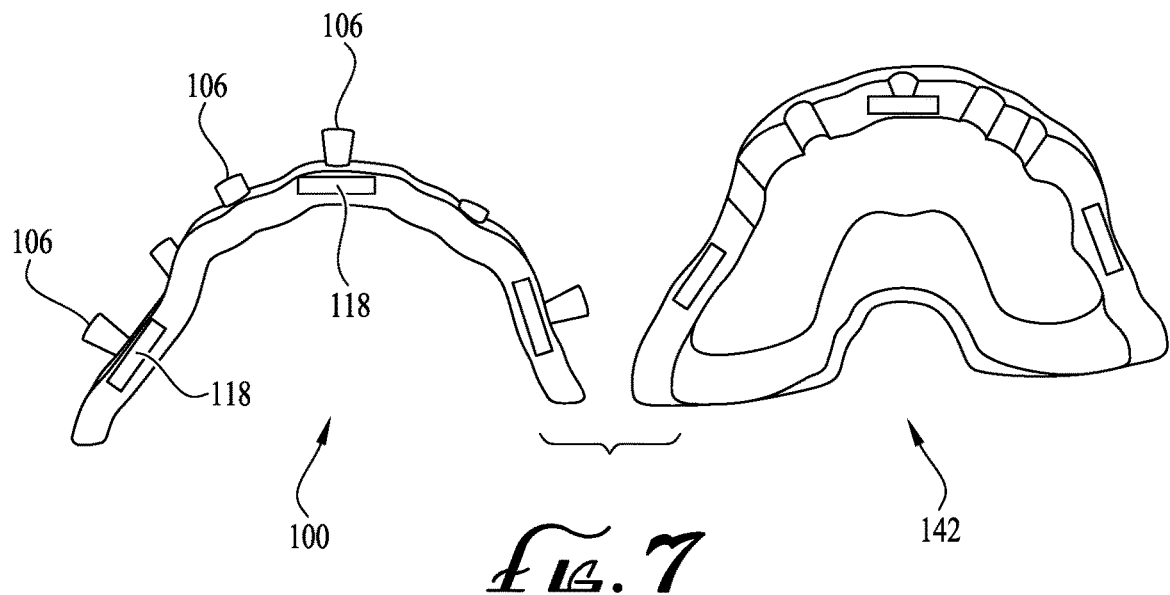
FIG. 7 is a plan view of a bone reduction guide next to the fixation base of FIG. 1.

In summary, apparatus of the invention may include fixation base 100, serving as a foundation for supporting subsequently used guides. Fixation base 100 may also have one edge or surface formed for use as a guide when removing bone tissue, as will be described hereinafter. As an alternative to forming one edge or surface of a guide, the apparatus may include a separate bone reduction guide 142 (FIG. 7). Bone reduction guide 142 has attachment structure cooperating with slots 118 and attachment elements 106 of fixation guide 100, and a surface against which an appropriate bone removal tool (not shown) may be moved while abrading bone tissue.

The apparatus may include first dental guide 122 to properly locate fixation base 100, second dental guide 124 as a drill guide, and third dental guide 136 to place abutments and to visually check alignments.

Exemplary methods of using the above apparatus to install multi-tooth dental prosthesis 10 will now be set forth.

A method of installing multi-tooth dental prosthesis 10 (e.g., as shown in FIG. 2) in a mouth of a patient may comprise obtaining anatomical data from the mouth of the patient; and from the obtained data, designing and fabricating dental prosthesis 10, fixation base 100 to serve as a mounting jig for other dental guides, an abutment guide base (third dental guide 136) to assure appropriate location of subsequently installed implants and abutments, and a drill guide (second dental guide 124) to assure appropriate location and orientation of holes to be drilled for implants 16.

The method may include installing fixation base 100 to maxillary or mandibular bone tissue of the patient; removing at least one of natural teeth, dental fixtures, and obstructive mouth tissues (none of these is shown) from the work site, to expose an underside of the maxillary or mandibular bone tissue.

The method may comprise recontouring the bone tissue (by bone removal); drilling implant holes into the recontoured bone tissue, using the drill guide attached to fixation base 100; installing implants 16; removing the drill guide (second dental guide 124); installing abutments 18, and using the abutment guide base (third dental guide 136) attached to fixation base 100.

The method may include installing copings 20 to abutments 18; installing dental prosthesis 10 over copings 20; bonding copings 20 to dental prosthesis 10; removing dental prosthesis 10, the abutment guide base (third dental guide 136) and fixation base 100; and permanently installing dental prosthesis 10 to abutments 18.

Anatomical data may be obtained via CT scans or other imagery techniques. From these images, one of skill in the dental arts may design a suitable prosthesis, and the apparatus described above.

The above is a description of a simplified or basic method. In the basic method, medically advisable procedures and steps such as irrigation are ignored to avoid obscuring the novel method. The basic method may be enhanced with the following additional steps.

The method may further comprise, after installing fixation base 100 to maxillary or mandibular bone tissue of the patient, cutting back gum tissue to expose forwardly facing surfaces of the bone tissue. This enables solid seating of fixation base 100 against relatively rigid anatomical features, so that geometric integrity is preserved when relying on fixation base 100 to locate other guides.

In the method, installing fixation base 100 to maxillary or mandibular bone tissue of the patient may further comprise drilling holes into the exposed forwardly facing surfaces of the bone tissue, and driving fasteners through fixation base 100 into the drilled holes, to secure fixation base 100 to the maxillary or mandibular bone. Using driven fasteners such as nails provides a relatively expeditious yet robust way of securing fixation base 100 to the bone tissue.

The method may further comprise designing and fabricating a mouthpiece (first dental guide 122, FIG. 4) from the obtained data of the mouth of the patient, wherein the mouthpiece complements fixation base 100 by conforming to some surfaces of the mouth of the patient not covered by fixation base 100. The method may further comprise using the mouthpiece to assist in locating fixation base 100 appropriately when installing fixation base 100 to maxillary or mandibular bone tissue of the patient, and removing the mouthpiece after installing fixation base 100 to the maxillary or mandibular bone tissue. As stated previously, including the mouthpiece enhances accuracy and geometric integrity of the installation, when compared to placing and relying solely on fixation base 100. It also enables fixation base 100 to be of minimal bulk, thereby affording better viewing of the procedure by the dental personnel.

Figure 8:
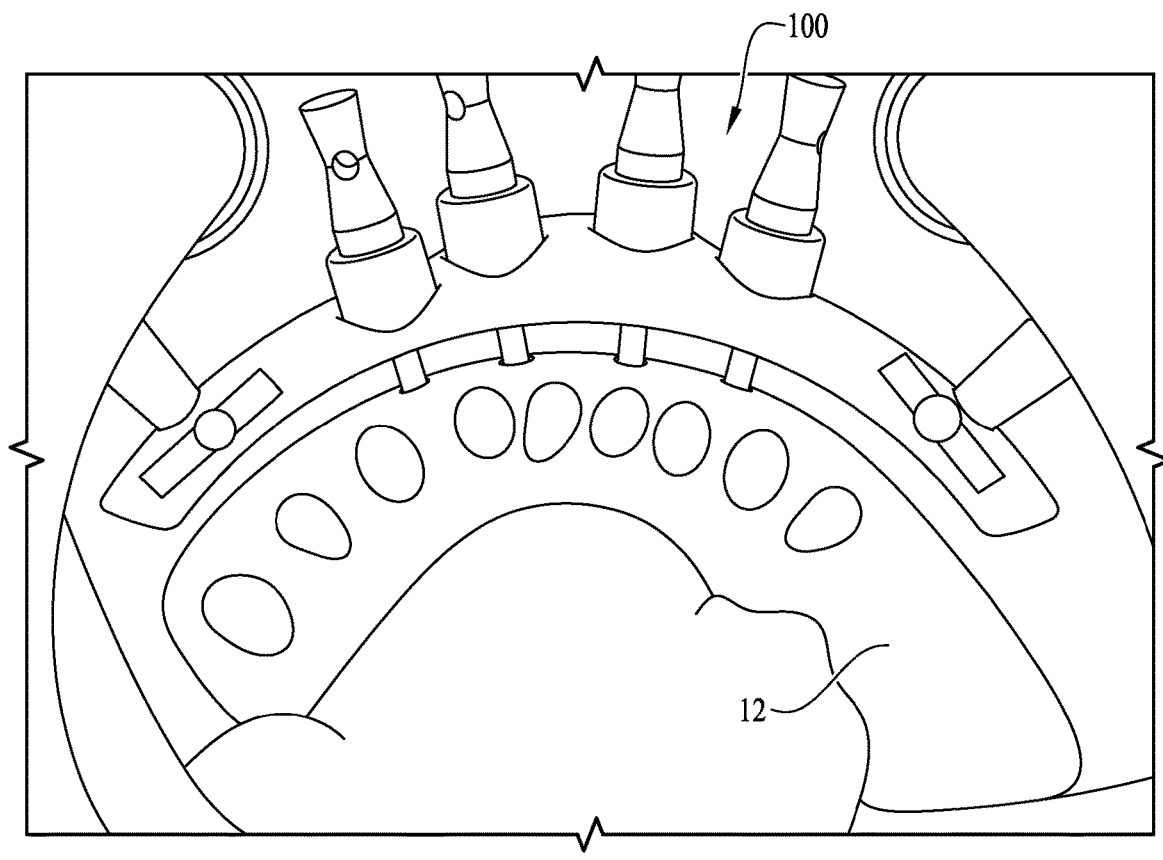
FIG. 8 is an environmental plan view of the fixation base of FIG. 1 installed to actual patient anatomy.

In the method recontouring the bone tissue may comprise using a preformed surface on fixation base 100 to guide a bone removal tool (not shown). In FIG. 8, fixation base 100 includes a surface formed to guide the bone removal tool. As may be seen in this view of actual patient anatomy, bulk of fixation base 100 is not excessive, and reduced bone tissue 12 remains in full view to the dental practitioner.

Referring to FIG. 7, in the method, recontouring the bone tissue may comprise using a bone removal guide 142 separate from fixation base 100 to guide a bone removal tool. Bone removal guide 142 may accommodate a revision to the desired contours, which revision may possibly not be reflected in or possible with fixation base 100. It may be, for example, that fixation base 100 was formed outside of specified geometric parameters. In this situation, fixation base 100 may nonetheless still be utilized.

Figure 9:
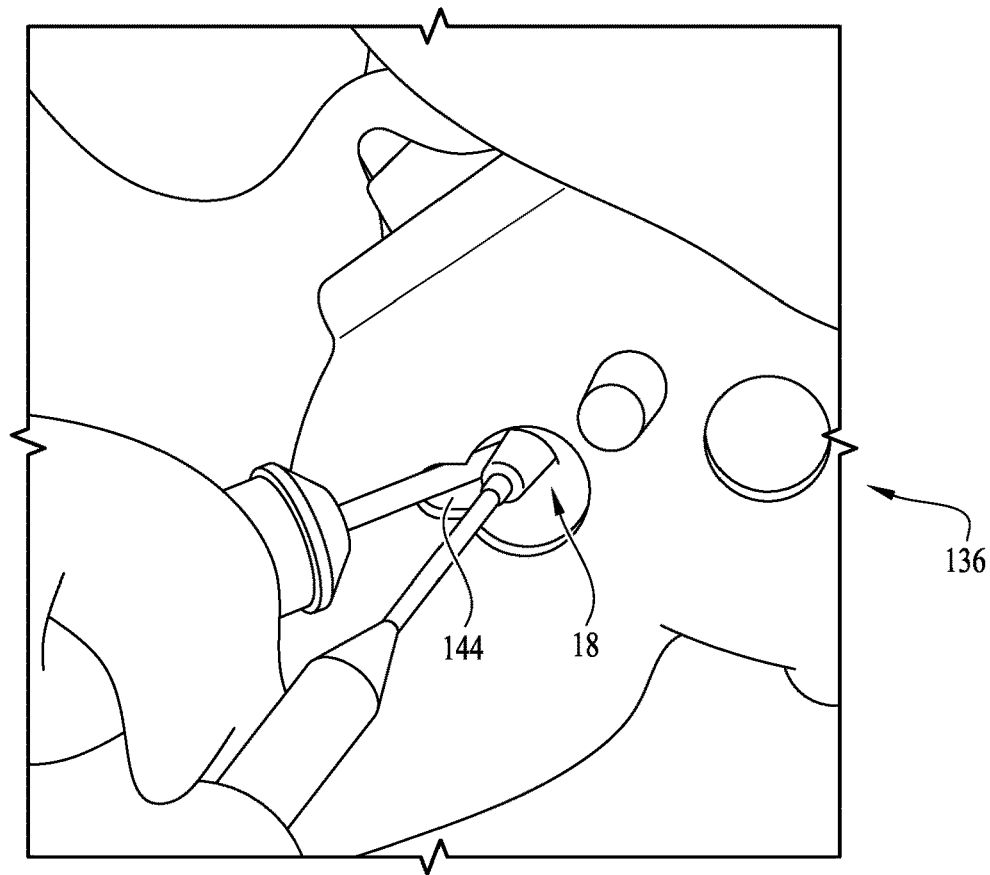
FIG. 9 is an environmental plan view of an abutment guide in use on an actual patient.

In the method, installing abutments 18 may include adjusting the abutments to appropriate angular orientations relative to a central axis of associated implants 16 using pre-established indicators in the abutment guide base. Referring to FIGS. 6 and 9, a bore 138 for an abutment 18 may include a notch 144 serving as an indicator for appropriate angular or rotational orientation of abutment 18. In FIG. 9, a tool such as a small screwdriver occupies notch 144 while another tool rotates abutment 18 appropriately.

In the method, installing dental prosthesis 10 over copings 20 and bonding copings 20 to dental prosthesis 10 may further comprise applying a blocking material to seal holes in the dental prosthesis for receiving abutments 18, and applying a settable resin spanning copings 20 and dental prosthesis 10. The settable resin seals gaps that would otherwise exist between copings 20 and dental prosthesis 10. This solidifies dental prosthesis 10 and copings 20 as a single component, and may discourage deposits of food and resultant growth of bacterial colonies.

The method of may further comprise, after removing dental prosthesis 10 after bonding copings 20 to dental prosthesis 10 and removing dental prosthesis 10, the abutment guide base (third dental guide 136, FIG. 6), and fixation base 100, verifying geometric orientations of attachment points for dental prosthesis 10. FIG. 10 shows a test fitment of dental prosthesis 10 in an actual patient after removal of third dental guide 136, although fixation base 100 has been left in place. Verification of attachment points may prevent a faulty installation going unnoticed until after the patient has left the dental office.

The method may further comprise, after removing dental prosthesis 10, the abutment guide base (third dental guide 136, FIG. 6), the fixation base 100, and prior to permanently installing dental prosthesis 10 to abutments 18, suturing gums of the patient in positions against the dental prosthesis. This reestablishes protections provided by gum tissue.

In the method, permanently installing the dental prosthesis may further comprise screwing dental prosthesis 10 to implants 10 or to abutments 18. While the latter is conventional, screwing dental prosthesis 10 in place to one or the other allows for subsequent removal, should that become necessary. In this context, permanent installation refers to ability of the patient to use the newly installed dental prosthesis 10 without further professional attention by the dental practitioner.

In the method, permanently installing dental prosthesis 10 may further comprise applying a filler material to fill recesses in a rearwardly facing surface of dental prosthesis 10. This may improve esthetics of the installation, and may eliminate places for food to lodge and bacteria to grow. Ordinarily, applied filler material is smoothed after curing, such as by sanding.

Figure 12A:
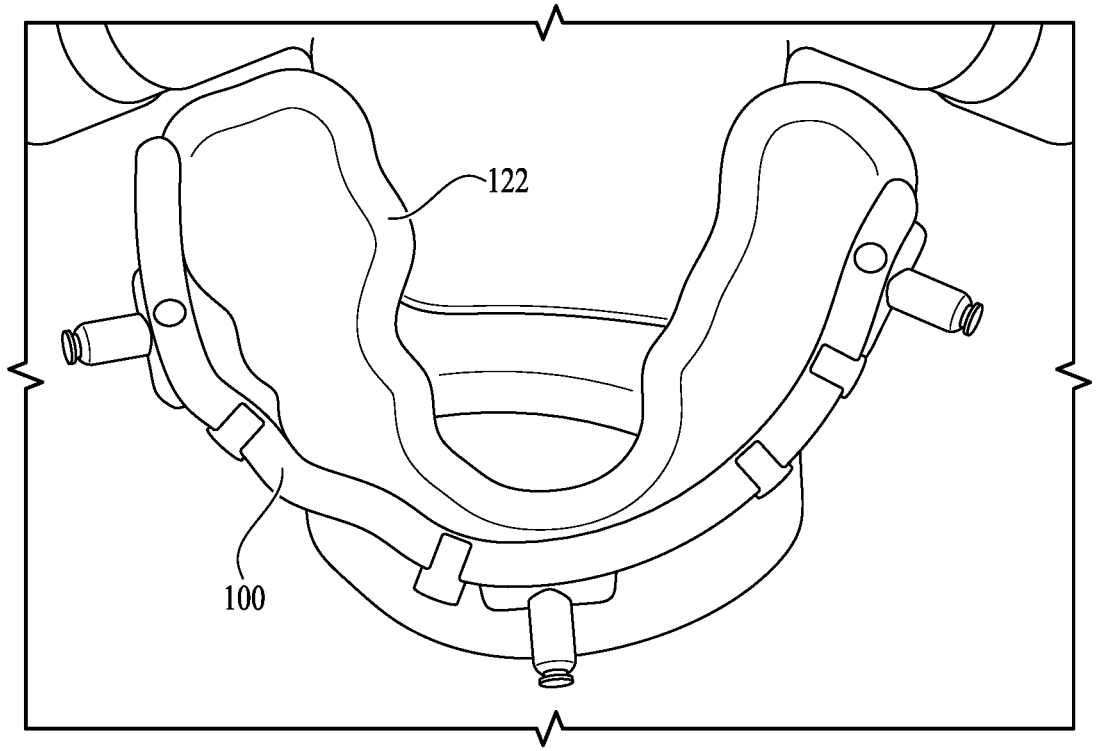
FIG. 12A is a view showing an exemplary embodiment of the fixation base with mouthpiece guide attached thereto.
Figure 12B:
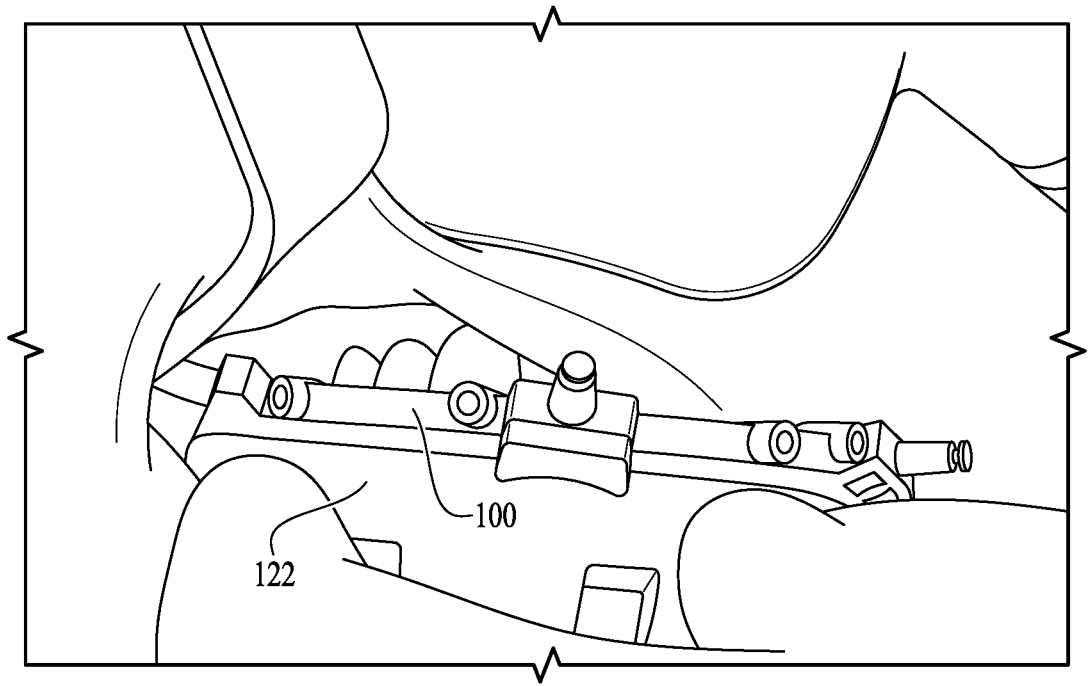
FIG. 12B is a view showing the fixation base with mouthpiece guide of FIG. 12A starting to be placed on a patient's teeth.
Figure 12C:
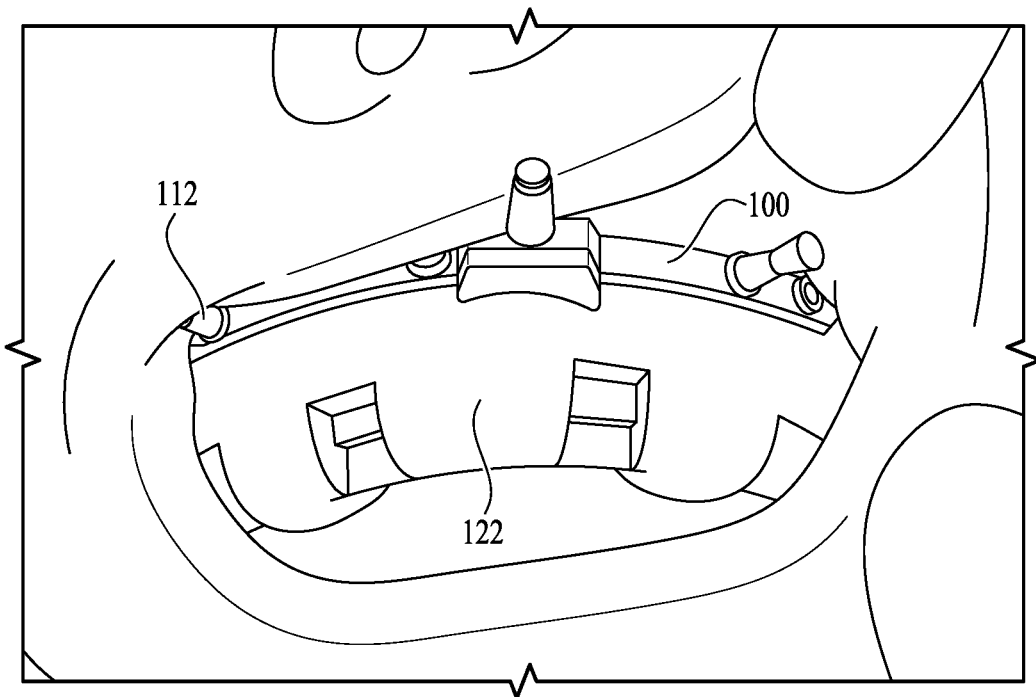
FIG. 12C a view showing the fixation base with mouthpiece guide of FIG. 12A properly fitted on a patient's teeth and with holes drilled and hammered in insertion pins.
Figure 12D:
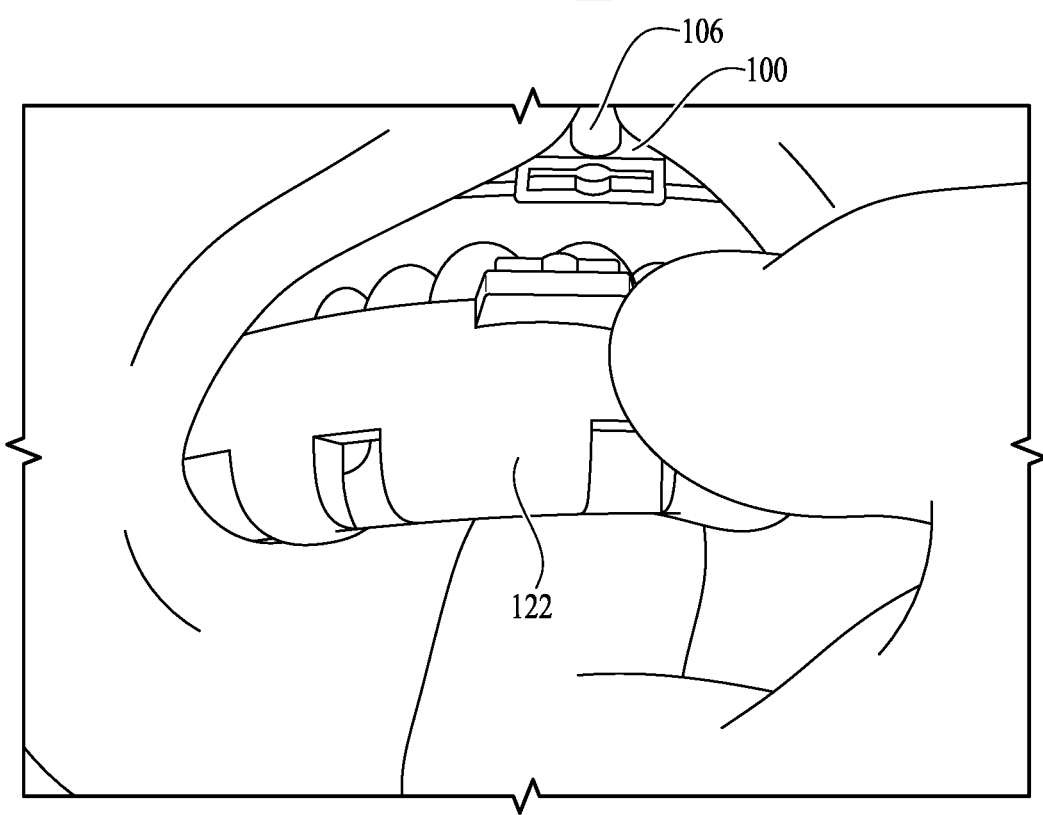
FIG. 12D a view showing the fixation base once secured having the mouthpiece guide removed by unlocking the pins and removing the mouthpiece guide.
Figure 12E:
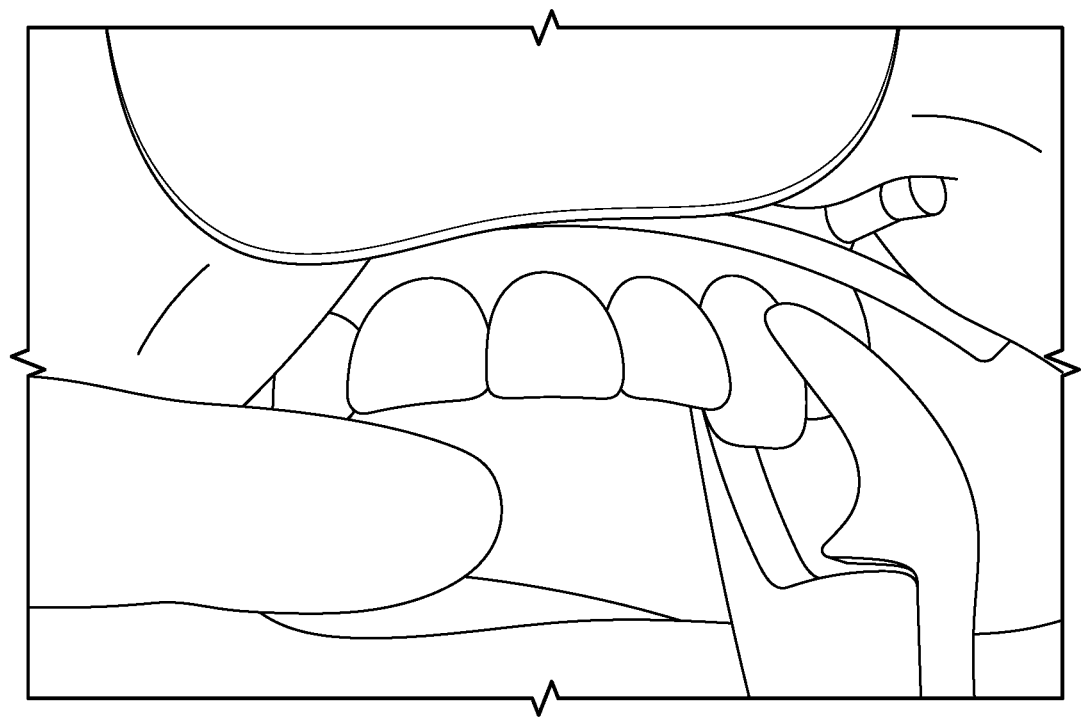
FIG. 12E a view showing teeth being removed.
Figure 12F:
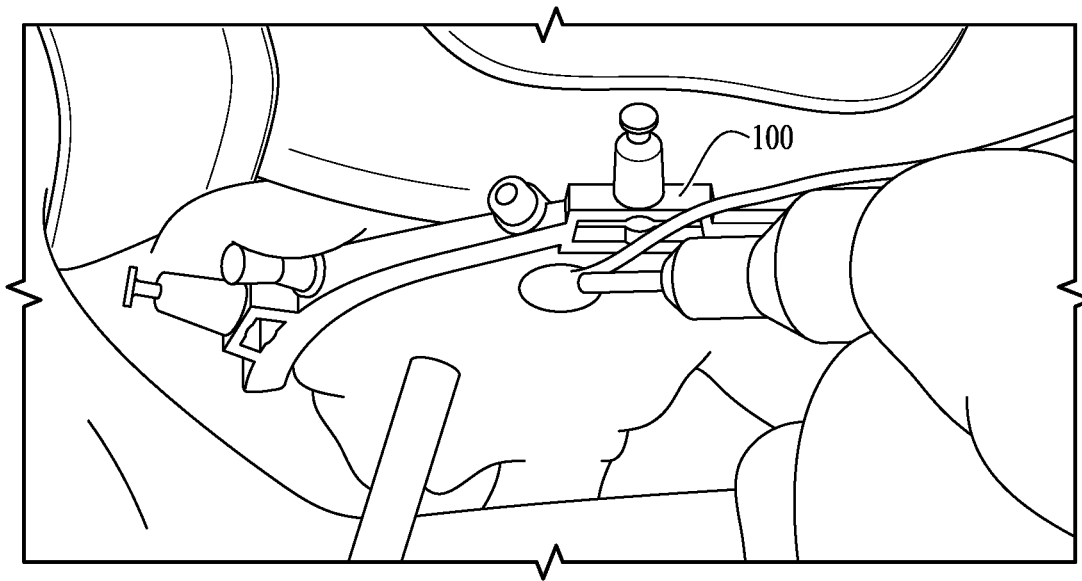
FIG. 12F a view showing bone being removed using the fixation base with an integrated bone reduction guide so that bone is flush with the fixation base.
Figure 12G:
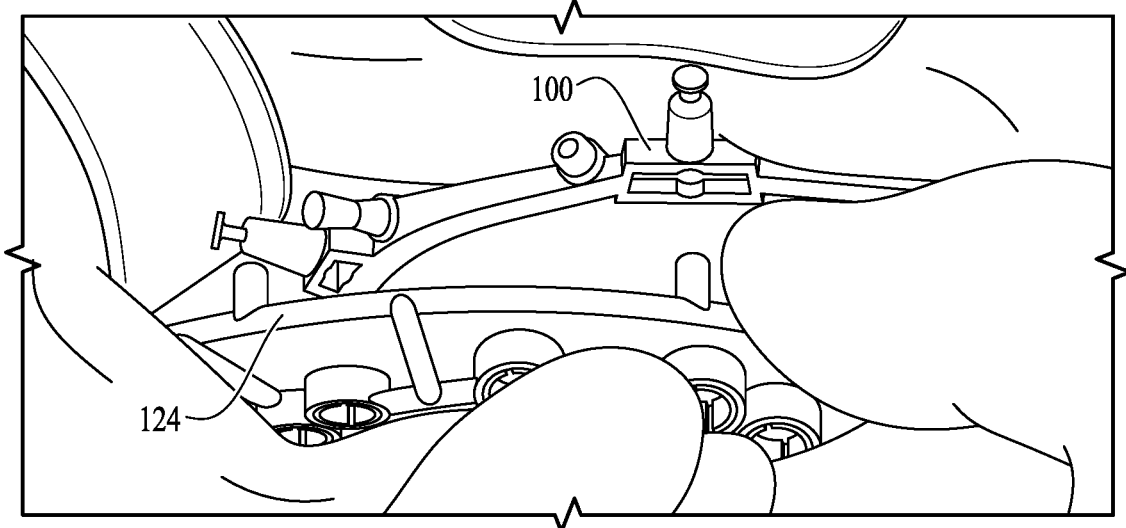
FIG. 12G is a view showing the drill guide being attached to the fixation base.
Figure 12H:
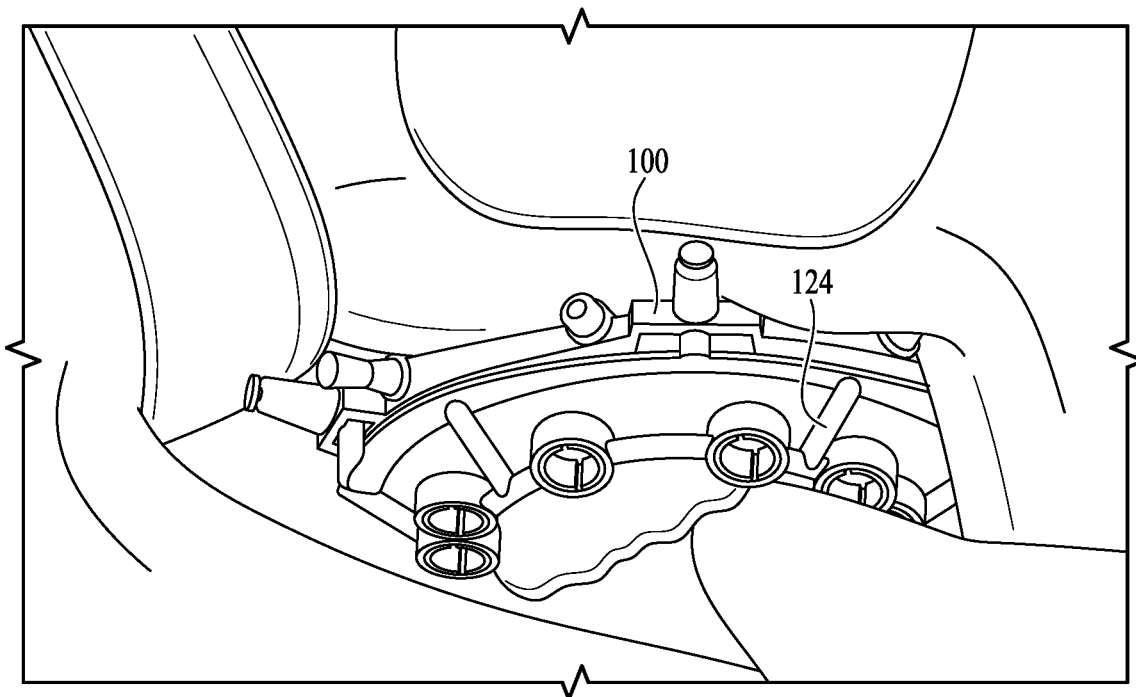
FIG. 12H is another view showing the drill guide attached to the fixation base.
Figure 12I:
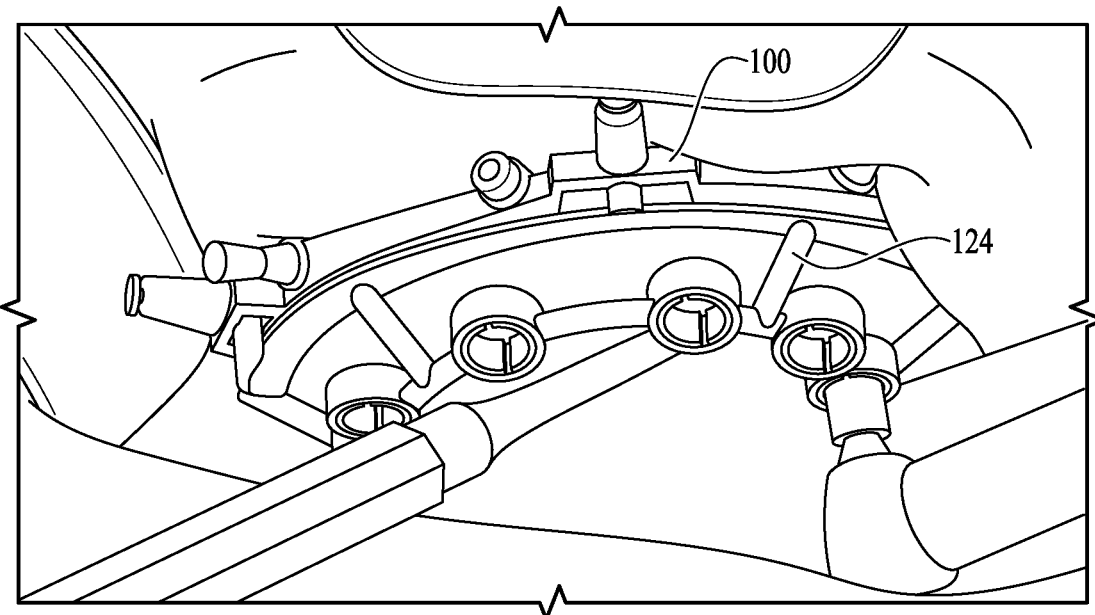
FIG. 12I is a view showing holes being drilled and setting implants, with the location, depth, and angles being managed through the drill guide and drill kit.
Figure 12J:
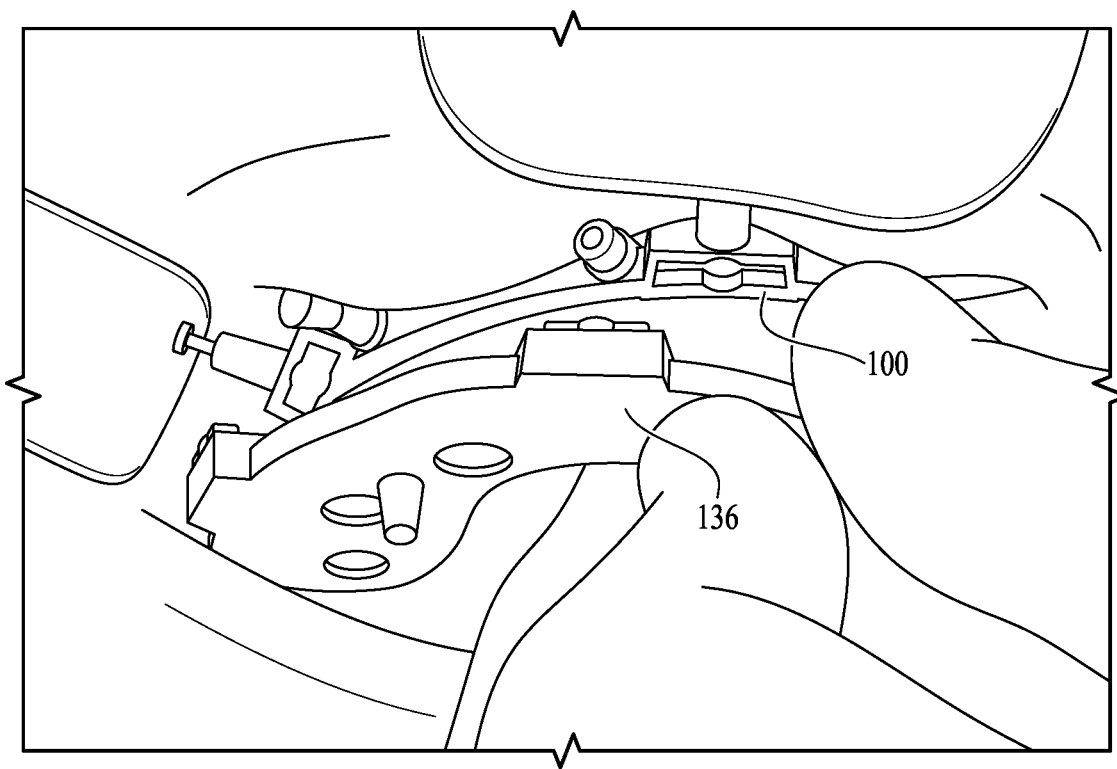
FIG. 12J is a view showing the drill guide removed and the abutment guide being attached to the fixation base.
Figure 12K:
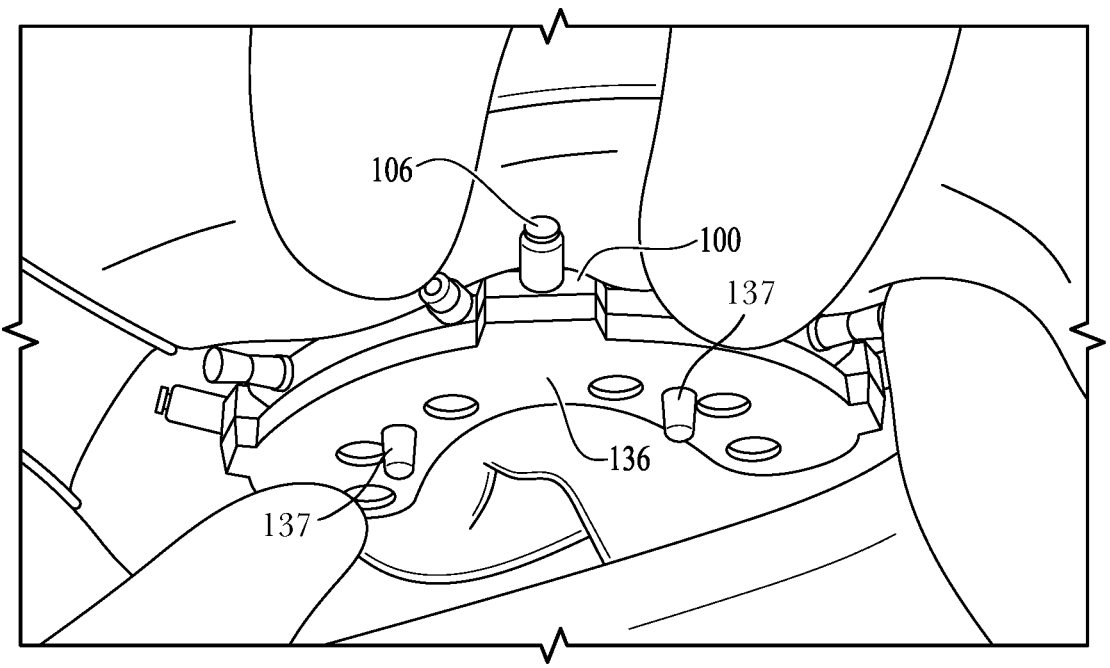
FIG. 12K is a view showing the abutment Guide mounted to the fixation base via locking pins.
Figure 12L:
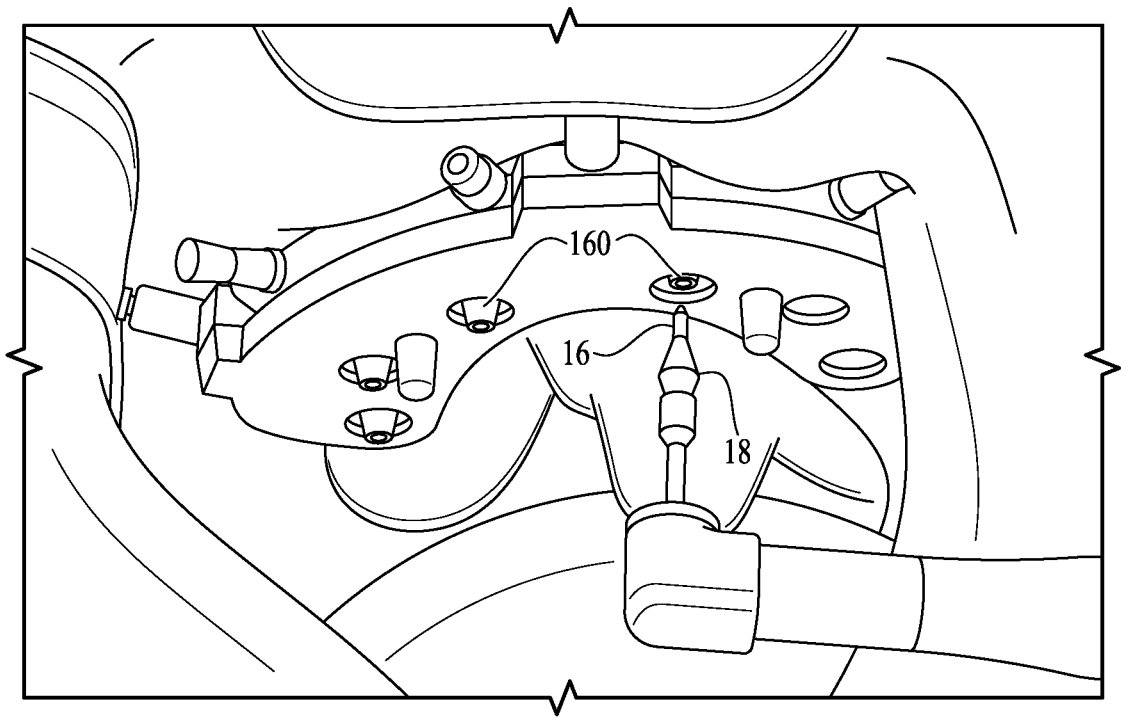
FIG. 12L is a view showing the abutments being attached to implants via holes in the abutment guide.
Figure 12M:
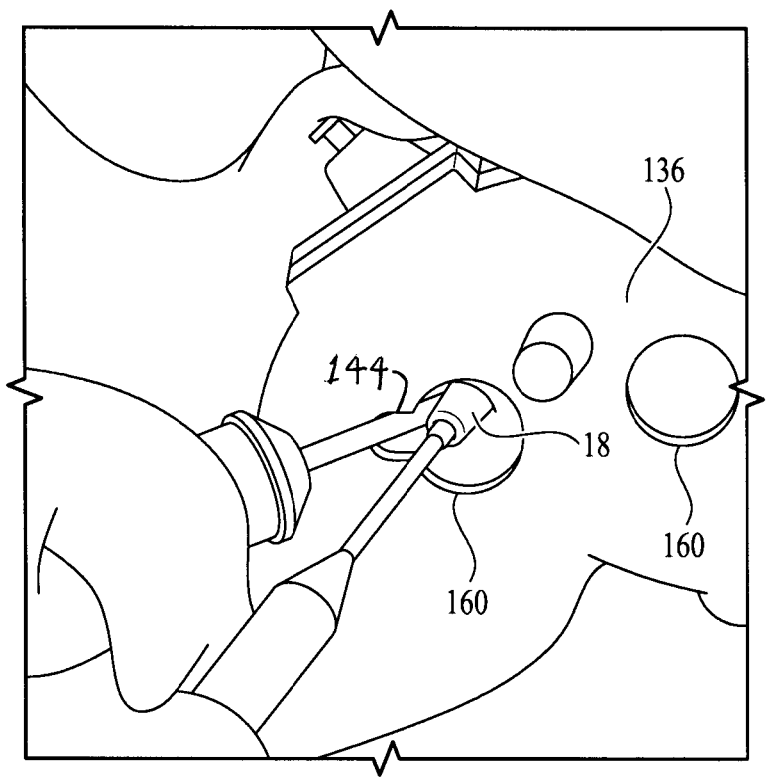
FIG. 12M is a view showing a notch in the hole where attachment screws are located to ensure proper positioning of the abutments.
Figure 12N:
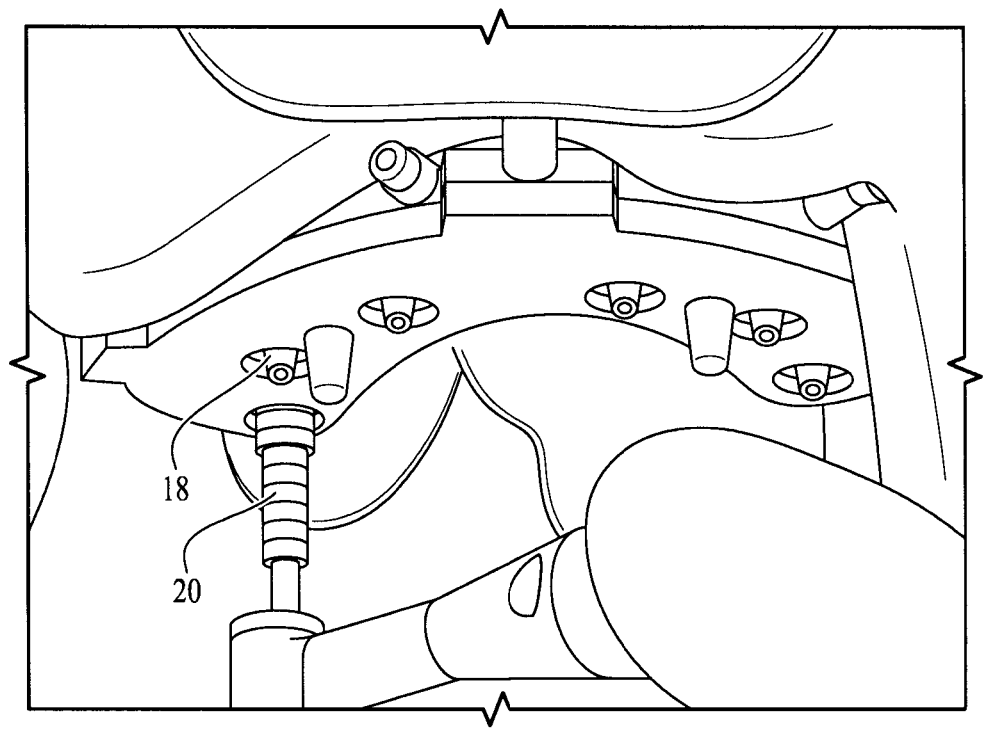
FIG. 12N is a view showing copings being attached to abutments.
Figure 12O:
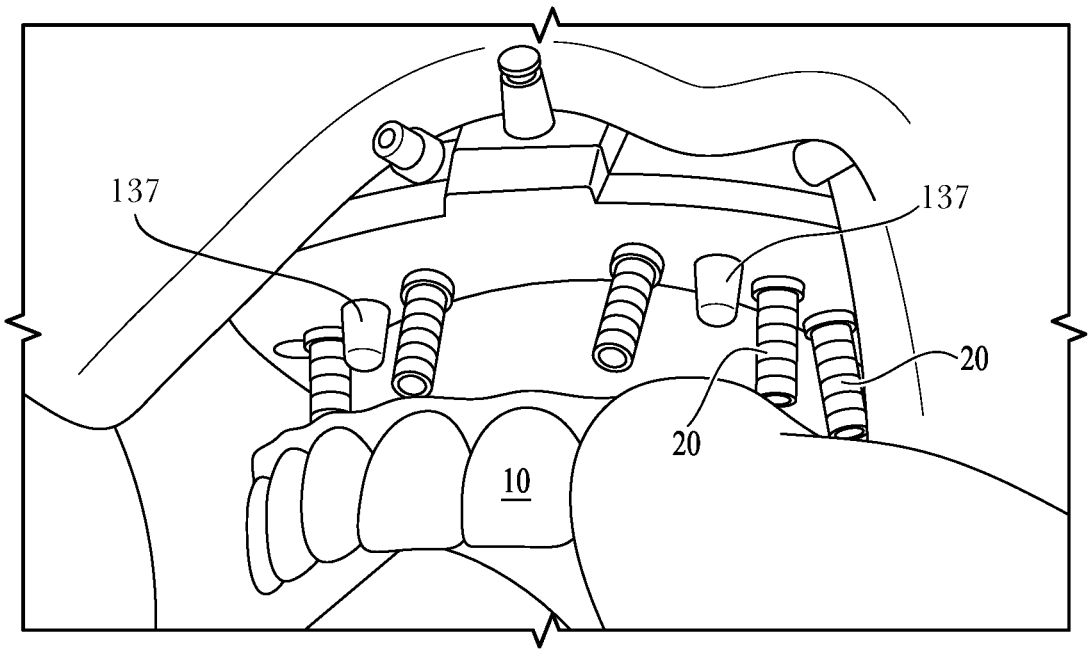
FIG. 12O is a view showing test fitment of the prosthesis and then removal.
Figure 12P:
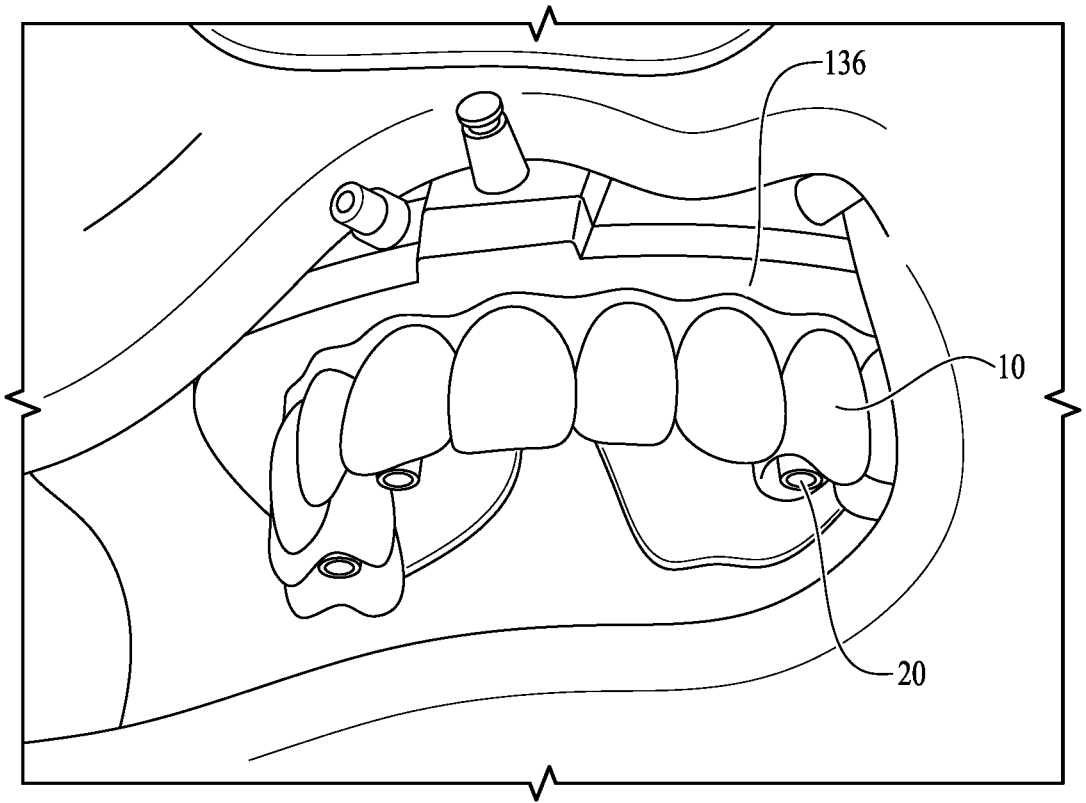
FIG. 12P is a view showing the prosthesis mounted to the abutment jib, and screwing in the prosthesis to the abutments via the copings.
Figure 12Q:
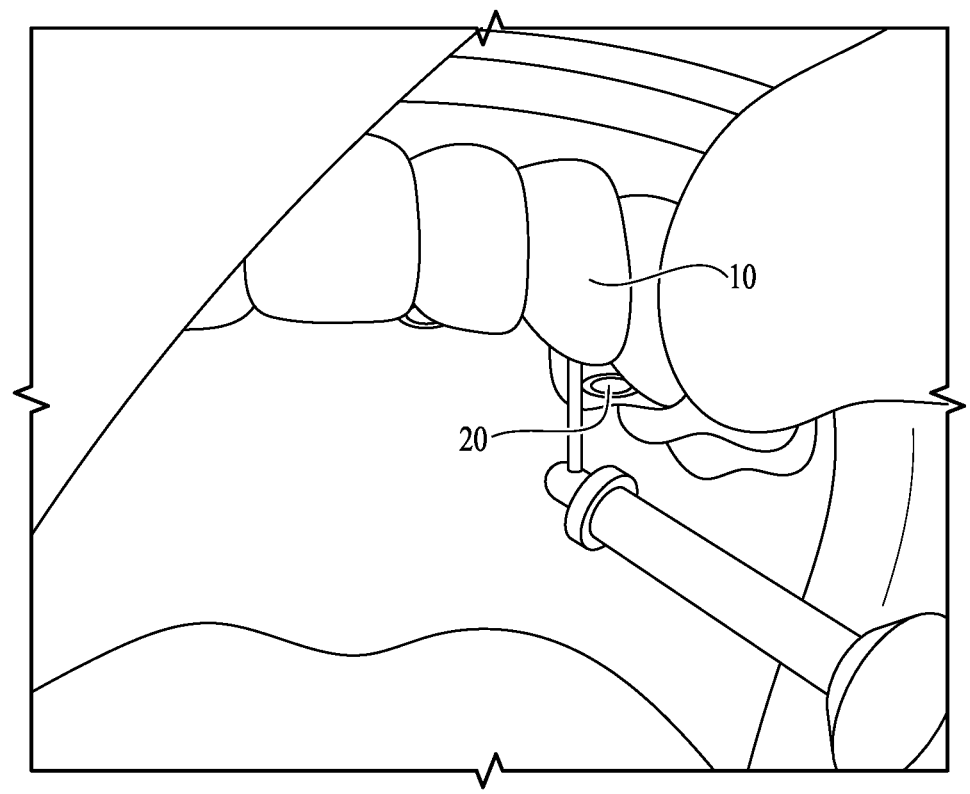
FIG. 12Q is a view showing inserting epoxy to fuse the prosthesis to the copings.
Figure 12R:
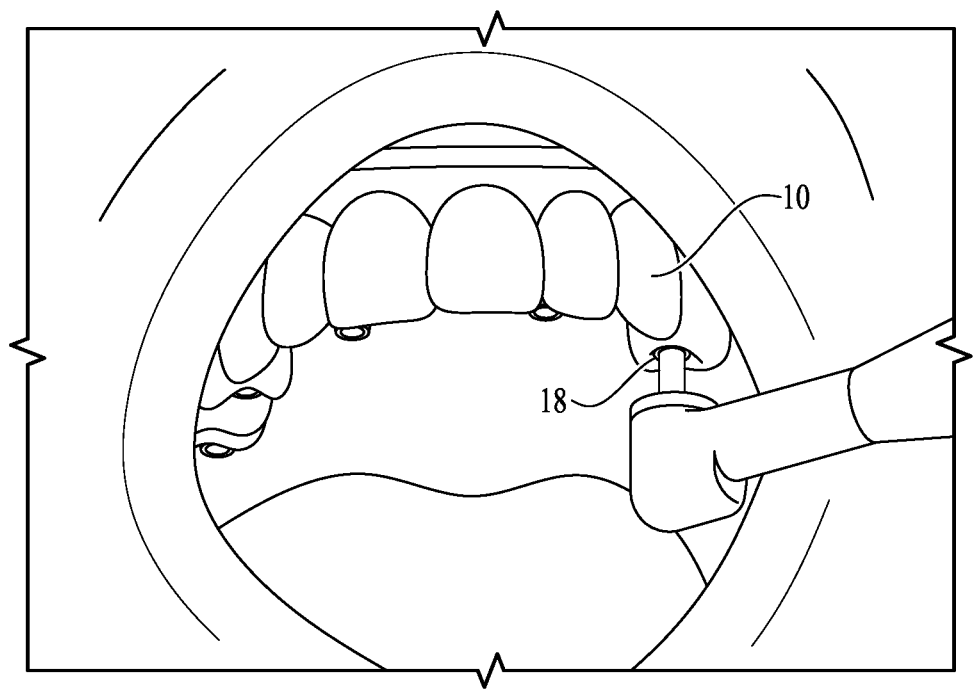
FIG. 12R is a view showing unscrewing the prosthesis from the abutments.
Figure 12S:
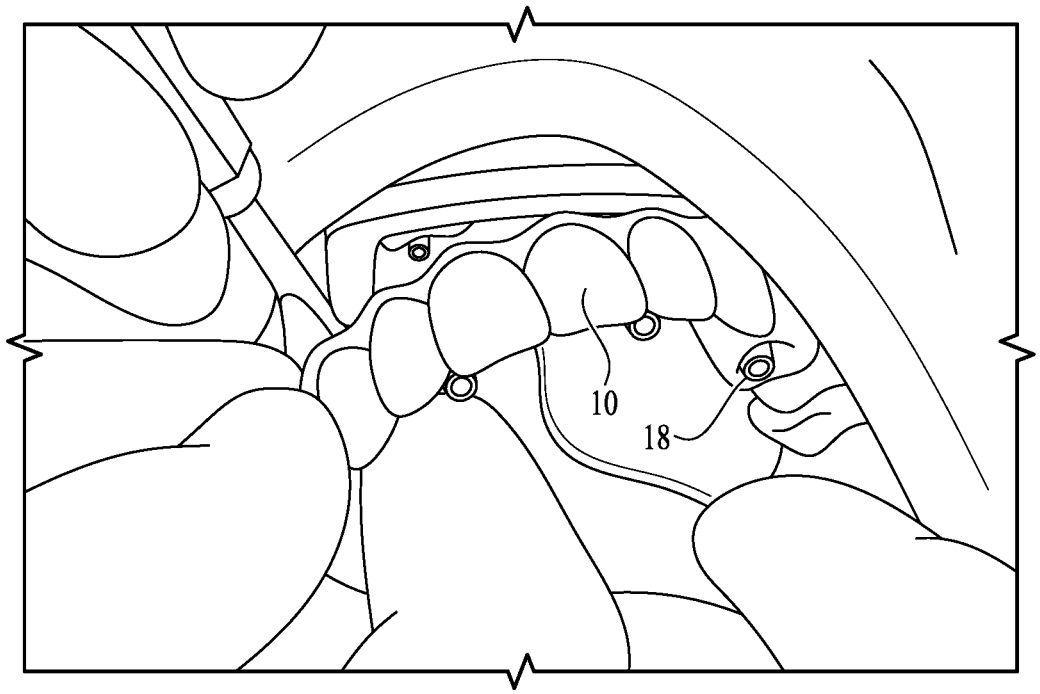
FIG. 12S is another view showing the prosthesis being removed from the abutments.
Figure 12T:
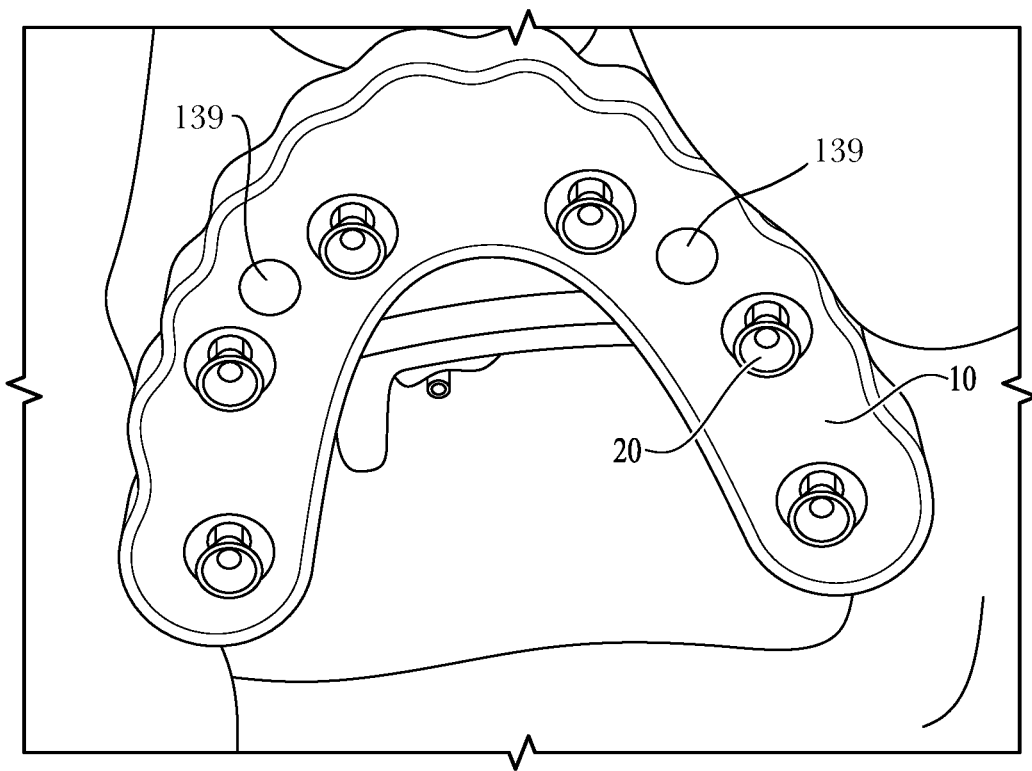
FIG. 12T is a view showing epoxy fusing the copings to the prosthesis.
Figure 12U:
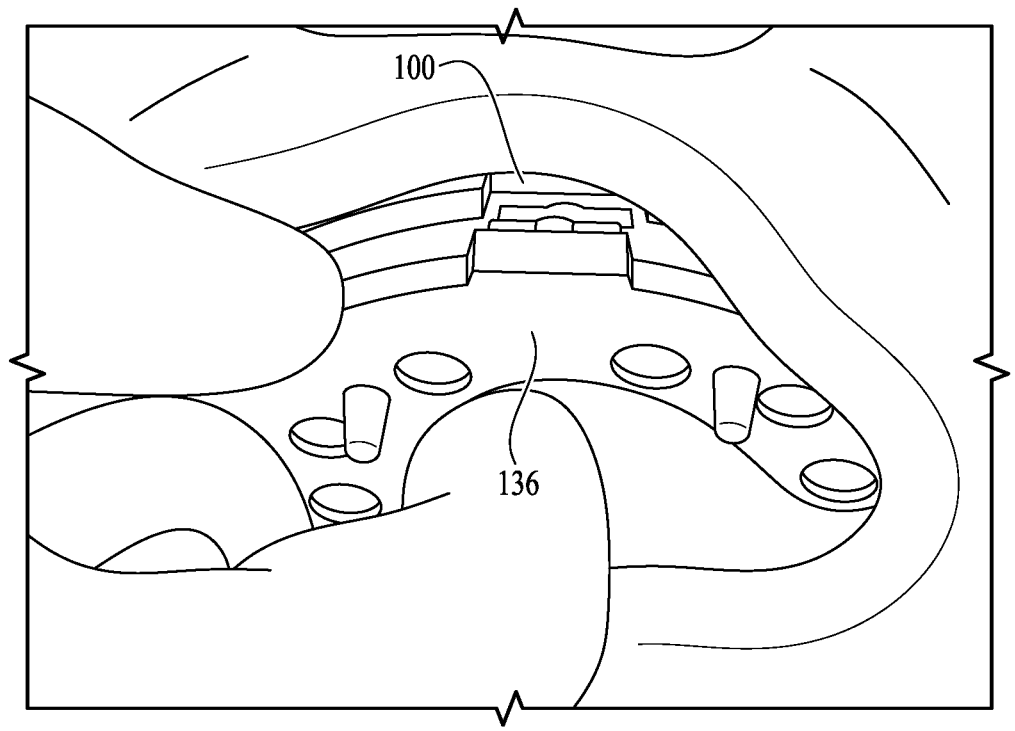
FIG. 12U is a view showing the abutment guide being removed from the fixation base.
Figure 12V:
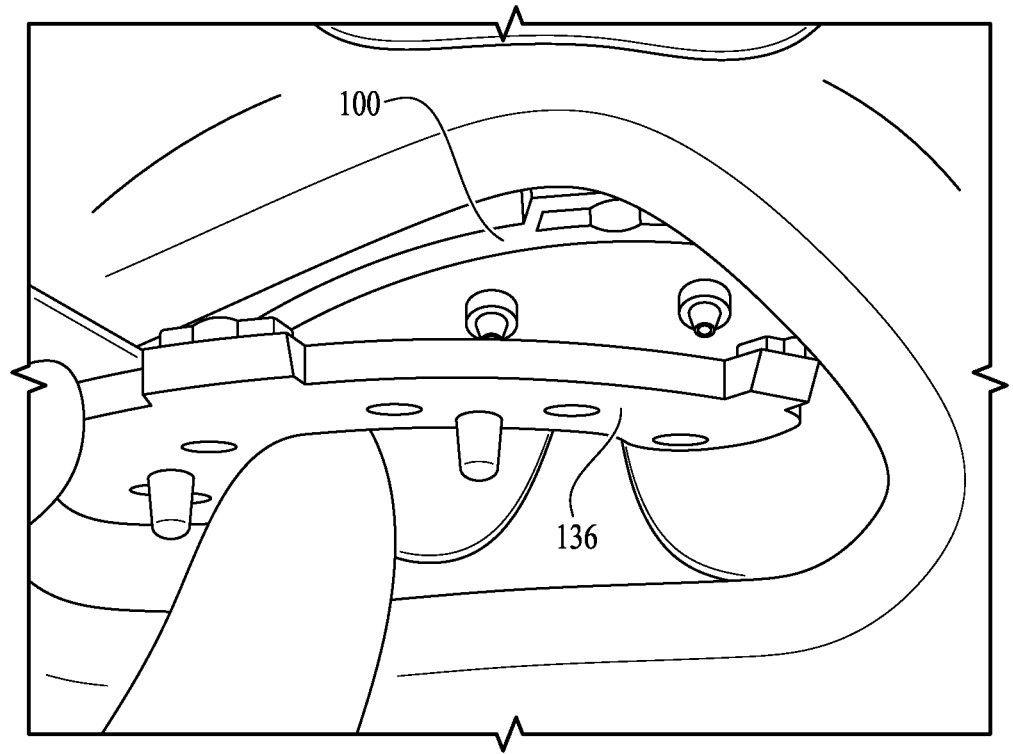
FIG. 12V is another view showing the abutment guide being removed from the fixation base.
Figure 12W:
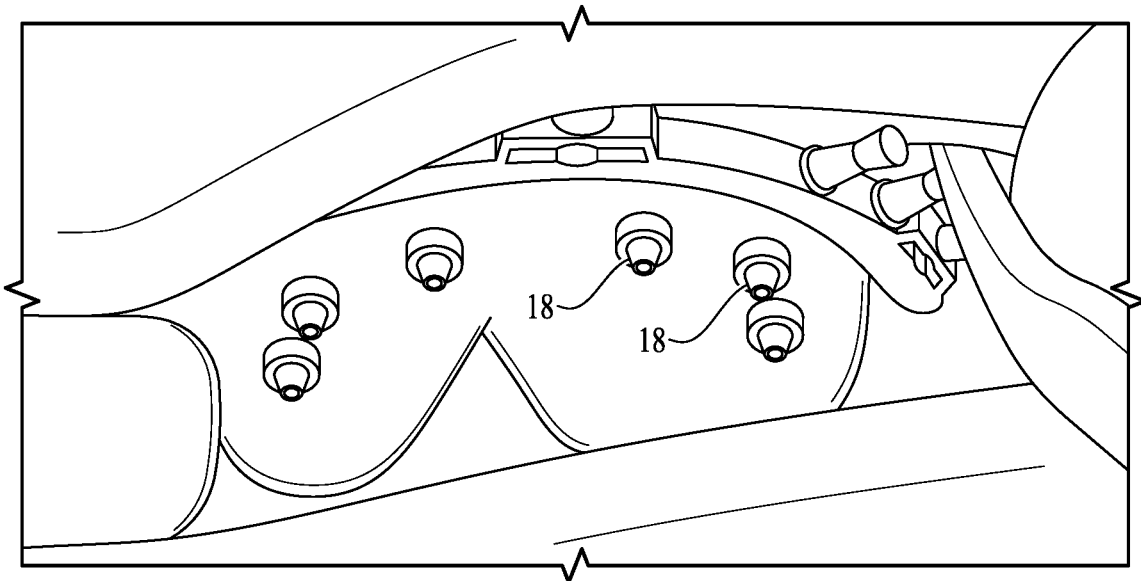
FIG. 12W is a view showing the abutments properly set and the fixation base being removed.
Figure 12X:
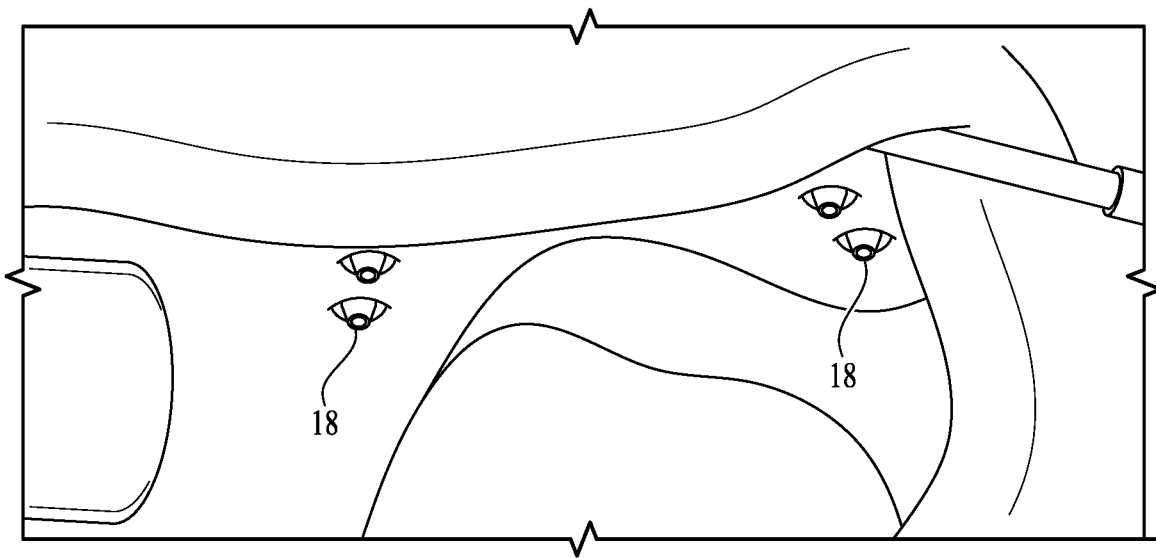
FIG. 12X is a view showing the fixation base removed and with the gums being sutured together around the abutments.
Figure 12Y:
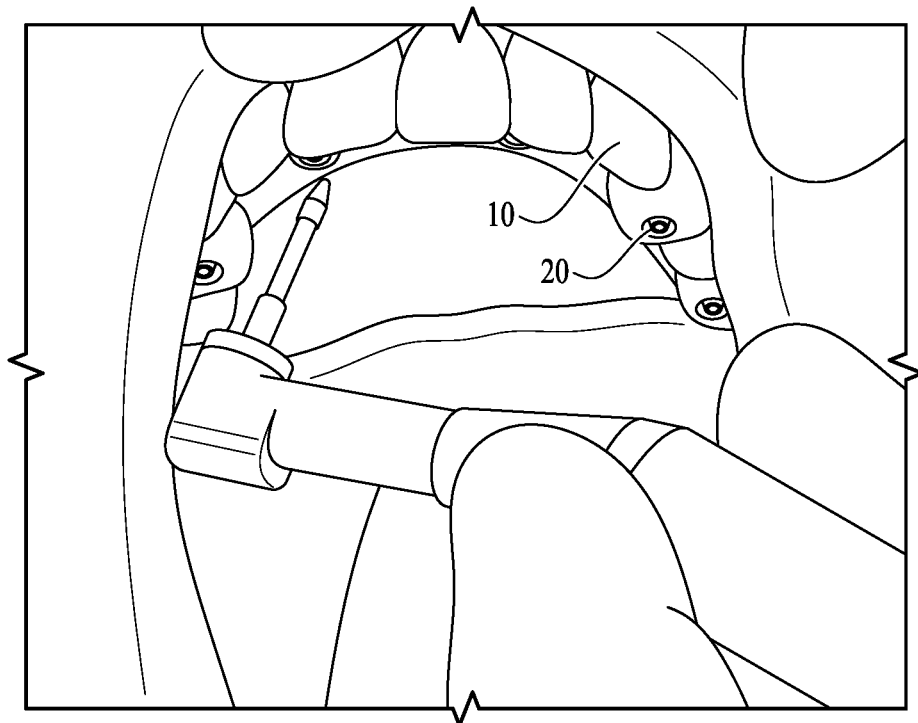
FIG. 12Y is a view showing the prosthesis being reinserted and mounted to the abutments via screws thought the copings; and, FIG. 12Z is a view showing the prosthesis being mounted.
Figure 12Z:
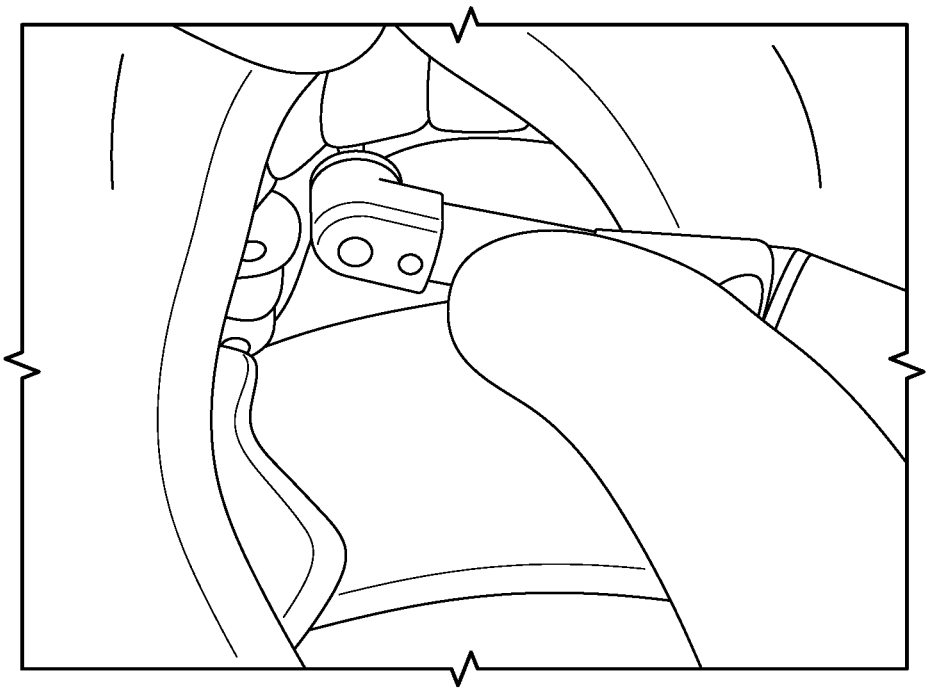

FIGS. 12A-12Z show step by step details of the aforementioned method of the invention. FIG. 12A is a view showing an exemplary embodiment of the fixation base 100 with mouthpiece guide 122 attached thereto. FIG. 12B is a view showing the fixation base 100 with mouthpiece guide 122 of FIG. 12A starting to be placed on a patient's teeth. FIG. 12C a view showing the fixation base 100 with mouthpiece guide 122 of FIG. 12A properly fitted on a patient's teeth and with holes drilled and hammered in insertion pins 112. FIG. 12D a view showing the fixation base 100 once secured having the mouthpiece guide 122 removed by unlocking the pins 106 and removing the mouthpiece guide 122. FIG. 12E a view showing teeth being removed. FIG. 12F a view showing bone being removed using the fixation base 100 with an integrated bone reduction guide so that bone is flush with the fixation base 100. FIG. 12G is a view showing the drill guide 124 being attached to the fixation base 100 and FIG. 12H is another view showing the drill guide 124 attached to the fixation base 100. FIG. 12I is a view showing holes being drilled and setting implants, with the location, depth, and angles being managed through the drill guide 124 and drill kit (not shown). FIG. 12J is a view showing the drill guide 124 and the abutment guide (also sometimes called abutment jig) 136 being attached to the fixation base 100, and FIG. 12K is a view showing the abutment guide 136 mounted to the fixation base 100 via locking pins 106. FIG. 12L is a view showing the abutments 18 being attached to implants 16 via holes 160 in the abutment guide 136. FIG. 12M is a view showing a notch 144 in the hole where attachment screws are located to ensure proper positioning of the abutments. FIG. 12N is a view showing copings 20 being attached to abutments 18. FIG. 12O is a view showing test fitment of the prosthesis 10 and then removal. FIG. 12P is a view showing the prosthesis 10 mounted to the abutment guide 136 and screwing in the prosthesis 10 to the abutments via the copings 20. FIG. 12Q is a view showing inserting epoxy to fuse the prosthesis 10 to the copings 20. FIG. 12R is a view showing unscrewing the prosthesis 10 from the abutments 18. FIG. 12S is another view showing the prosthesis 10 being removed from the abutments 18. FIG. 12T is a view showing epoxy fusing the copings 20 to the prosthesis 10. FIGS. 12U and 12V are views showing the abutment guide 136 being removed from the fixation base 100. FIG. 12W is a view showing the abutments 18 properly set and the fixation base removed. FIG. 12X is a view showing the fixation base removed and with the gums being sutured together around the abutments 18. FIG. 12Y is a view showing the prosthesis 10 being reinserted and mounted to the abutments 18 via screws thought the copings 20. Lastly, FIG. 12Z is a view showing the prosthesis 10 being mounted. While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A method of recontouring the maxillary or mandibular bone tissue of a patient, the method comprising:
   utilizing a fixation base, wherein the fixation base comprises a generally arcuate shape with a front surface that has a plurality of openings through which fasteners can be passed, a rear surface, and a horizontal surface;
   releasably attaching a mouthpiece to the fixation base;
   installing the fixation base to the maxillary or mandibular bone tissue of the patient by utilizing the mouthpiece that is releasably attached to the fixation base, wherein the mouthpiece is configured and dimensioned to surround the teeth of said patient and is used to assure the appropriate location to attach the fixation base to the maxillary or mandibular bone tissue of said patient;
   removing the releasably attachable mouthpiece from the fixation base once the fixation base is installed to the maxillary or mandibular bone tissue of the patient; and
   recontouring the bone tissue.

2. The method of claim 1, wherein installing the fixation base to maxillary or mandibular bone tissue of the patient further comprises:
   driving fasteners through the fixation base into the drilled holes, to secure the fixation base to the maxillary or mandibular bone.

3. The method of claim 1, further comprising the step of removing at least one of natural teeth, dental fixtures, and obstructive mouth tissues from the work site, to expose an underside of the maxillary or mandibular bone tissue prior to the step of recontouring the bone tissue.

4. The method of claim 1, wherein the step of recontouring the bone tissue comprises using a preformed surface on the installed fixation base to assure proper recontouring of the bone tissue.

5. The method of claim 4, wherein the preformed surface on the installed fixation base is said horizontal surface.

6. The method of claim 1, wherein the step of recontouring the bone tissue comprises utilizing a bone reduction guide that attaches to the installed fixation base to assure proper recontouring of the bone tissue.

7. An apparatus for guiding the recontouring of maxillary or mandibular bone tissue of a patient, the apparatus comprising:
   a fixation base having
      a generally arcuate base member with a front surface that includes a plurality of openings through which fasteners can be passed,
      a rear surface,
      a horizontal surface, and
      a preformed surface to assure proper recontouring of the bone tissue; and
   a mouthpiece that releasably attaches to the fixation base and is configured and dimensioned to surround the teeth of said patient to assure appropriate location to attach the fixation base to the maxillary or mandibular bone tissue of said patient.

8. The apparatus of claim 7, wherein at least a portion of said horizontal surface is said preformed surface on the fixation base.

9. An apparatus for guiding the recontouring of maxillary or mandibular bone tissue of a patient, the apparatus comprising:
   a fixation base for providing an attachment surface;
   a mouthpiece that releasably attaches to the fixation base and is configured and dimensioned to surround the teeth of said patient to assure appropriate location to attach the fixation base to the maxillary or mandibular bone tissue of said patient; and
   a bone reduction guide attachable to said fixation base in a position wherein the bone reduction guide is oriented to assist in the proper recontouring of the maxillary or mandibular bone tissue of said patient.

10. The apparatus of claim 9, wherein the fixation base includes one or more releasable attachment elements for attachment of the bone reduction guide to the fixation base.

11. The apparatus of claim 10, wherein the releasable attachment elements of the fixation base includes a plurality of slots in the horizontal surface of said base member of the fixation base, and wherein the bone reduction guide includes a plurality of tabs extending toward and fitting closely with the slots of the fixation base, whereby the bone reduction guide engages the fixation base by interfit between the slots of the fixation base and the tabs of the bone reduction guide.

* * * * *